United States Patent
Damnjanovic et al.

(10) Patent No.: US 12,256,353 B2
(45) Date of Patent: Mar. 18, 2025

(54) CELL SYNCHRONIZATION AND TIMING MANAGEMENT IN A WIRELESS NETWORK

(71) Applicant: QUALCOMM Incorporated, San Diego, CA (US)

(72) Inventors: Jelena Damnjanovic, Del Mar, CA (US); Shanyu Zhou, San Diego, CA (US); Aleksandar Damnjanovic, Del Mar, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 376 days.

(21) Appl. No.: 17/718,270

(22) Filed: Apr. 11, 2022

(65) Prior Publication Data
US 2023/0328672 A1    Oct. 12, 2023

(51) Int. Cl.
*H04W 56/00*  (2009.01)
*H04W 74/0833*  (2024.01)

(52) U.S. Cl.
CPC ... *H04W 56/0045* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2021/0195547 A1 | 6/2021 | Pezeshki et al. | |
| 2023/0171776 A1* | 6/2023 | Dinan | H04W 76/27 370/336 |
| 2023/0217499 A1* | 7/2023 | Jeon | H04W 76/30 |
| 2023/0371112 A1* | 11/2023 | Jeon | H04W 52/28 |
| 2024/0023045 A1* | 1/2024 | Da Silva | H04W 36/249 |

FOREIGN PATENT DOCUMENTS

| | | |
|---|---|---|
| WO | 2022006502 A1 | 1/2022 |
| WO | 2022054876 A1 | 3/2022 |

OTHER PUBLICATIONS

International Search Report and Written Opinion—PCT/US2023/015689—ISA/EPO—Jun. 16, 2023.

* cited by examiner

*Primary Examiner* — Clemence S Han
(74) *Attorney, Agent, or Firm* — QUALCOMM Incorporated

(57) ABSTRACT

Aspects of the disclosure provide techniques for enabling cell synchronization and timing adjustment management in layer 1 and layer 2 (L1-L2) centric mobility applications. A user equipment (UE) communicates with a network entity using one or more cells of a plurality of cells that are configured for mobility operations using layer 1 and layer 2 (L1-L2) centric signaling. The plurality of cells are grouped into one or more timing adjustment groups (TAGs). The UE updates timing advance of the plurality of cells per group according to the one or more TAGs.

42 Claims, 17 Drawing Sheets

CELL SYNCHRONIZATION AND TIMING MANAGEMENT IN A WIRELESS NETWORK

TECHNICAL FIELD

The technology discussed below relates generally to wireless communication systems, and more particularly, to cell synchronization and timing management in a wireless network configured for layer 1 and layer 2 centric mobility.

INTRODUCTION

Wireless communication systems are widely deployed to provide various telecommunication services such as telephony, video, data, messaging, and broadcasts. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Mobility management generally relies on the monitoring of a wireless communication device as it moves through the network, and managing timing synchronization of cells with that device. In a 5G NR network, inter-cell mobility can be based on beam-based mobility where the indicated beam can be from a network entity with a different physical cell identity (PCI) with respect to the serving cell.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the disclosure provide techniques for enabling cell synchronization and timing adjustment management in layer 1 and layer 2 (L1-L2) centric mobility applications.

One aspect of the disclosure provides a user equipment (UE) for wireless communication. The UE includes a transceiver, a memory, and a processor coupled to the transceiver and the memory. The processor and the memory are configured to communicate with a network entity using one or more cells of a plurality of cells that are configured for mobility operations. The plurality of cells are grouped into one or more timing adjustment groups (TAGs). The processor and the memory are further configured to update timing advance of the plurality of cells per group according to the one or more TAGs in response to the mobility operations. In some aspects, the mobility operations may use layer 1 and layer 2 (L1-L2) centric signaling.

Another aspect of the disclosure provides a method of wireless communication at a UE. The method includes communicating with a network entity using one or more cells of a plurality of cells that are configured for mobility operations. The plurality of cells are grouped into one or more timing adjustment groups (TAGs). The method further includes updating timing advance of the plurality of cells per group according to the one or more TAGs in response to the mobility operations. In some aspects, the mobility operations may use layer 1 and layer 2 (L1-L2) centric signaling Another aspect of the disclosure provides a network entity for wireless communication. The network entity includes a transceiver, a memory, and a processor coupled to the transceiver and the memory. The processor and the memory are configured to communicate with a UE using one or more cells of a plurality of cells that are configured for mobility operations. The plurality of cells are grouped into one or more timing adjustment groups (TAGs). The processor and the memory are further configured to update timing advance of the plurality of cells per group according to the one or more TAGs in response to the mobility operations. In some aspects, the mobility operations may use layer 1 and layer 2 (L1-L2) centric signaling Another aspect of the disclosure provides a method of wireless communication at a network entity. The method includes communicating with a UE using one or more cells of a plurality of cells that are configured for mobility operations using layer 1 and layer 2 (L1-L2) centric signaling. The plurality of cells are grouped into one or more timing adjustment groups (TAGs). The method further includes updating timing advance of the plurality of cells per group according to the one or more TAGs.

Another aspect of the disclosure provides a UE for wireless communication. The UE includes means for communicating with a network entity using one or more cells of a plurality of cells that are configured for mobility operations, the plurality of cells grouped into one or more timing adjustment groups (TAGs). The UE further includes means for updating timing advance of the plurality of cells per group according to the one or more TAGs in response to the mobility operations. In some aspects, the mobility operations may use layer 1 and layer 2 (L1-L2) centric signaling Another aspect of the disclosure provides a computer-readable storage medium including code executable by an apparatus for wireless communication. The code causes the apparatus to communicate with a network entity using one or more cells of a plurality of cells that are configured for mobility operations. The plurality of cells are grouped into one or more timing adjustment groups (TAGs). The code further causes the apparatus to update timing advance of the plurality of cells per group according to the one or more TAGs in response to the mobility operations. In some aspects, the mobility operations may use layer 1 and layer 2 (L1-L2) centric signaling Another aspect of the disclosure provides a network entity for wireless communication. The network entity includes means for communicating with a UE using one or more cells of a plurality of cells that are configured for mobility operations. The plurality of cells are grouped into one or more timing adjustment groups (TAGs). The network entity further includes means for updating timing advance of the plurality of cells per group according to the one or more TAGs in response to the mobility operations. In some aspects, the mobility operations may use layer 1 and layer 2 (L1-L2) centric signaling Another aspect of the disclosure provides a computer-readable storage medium including code executable by an apparatus for wireless communication. The code causes the apparatus to communicate with a UE using one or more cells of a plurality of cells that are configured for mobility operations. The plurality of cells are grouped into one or more timing adjustment groups (TAGs). The code further causes the apparatus to update timing advance of the plurality of cells per group according to the one or more TAGs in response to the mobility operations. In some aspects, the mobility operations may use layer 1 and layer 2 (L1-L2) centric signaling These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

DETAILED DESCRIPTION

Figure 1:
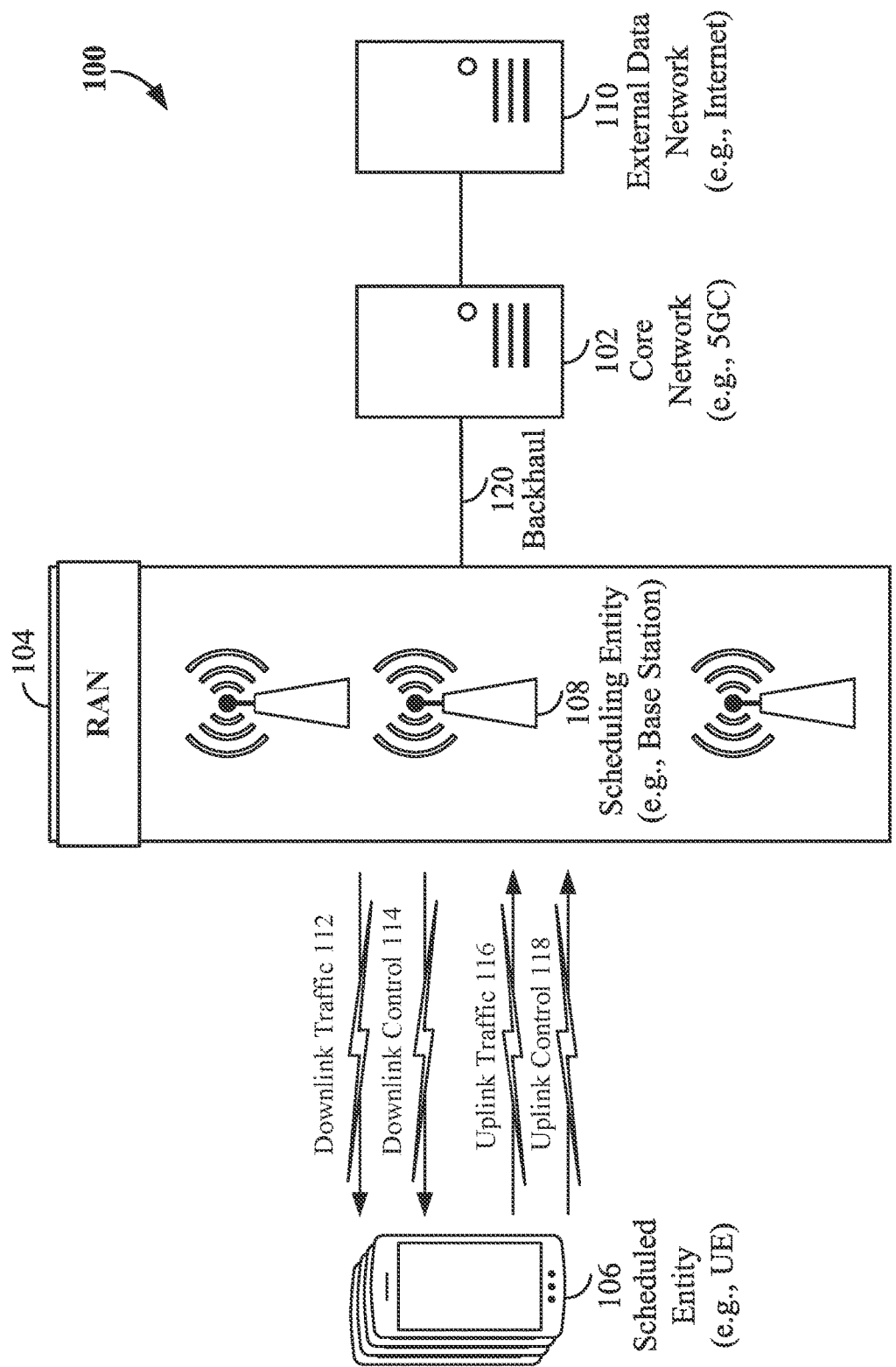
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

Various aspects directed towards layer 1 and layer 2 centric inter-cell mobility are disclosed. For 5G New Radio (NR) systems, inter-cell mobility may be signaled using layer 1 (i.e., the L1 or physical layer (PHY)) and layer 2 (i.e., the L2 or medium access control (MAC) layer) centric signaling (i.e., without using L3 signaling). It is noted that within the 5G NR framework, various operations or modes for such L1 and L2 (L1-L2) centric inter-cell mobility may be possible for different operational scenarios as will be further described herein. Some aspects of the present disclosure provide techniques for enabling cell synchronization and timing adjustment management in L1-L2 centric mobility applications.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
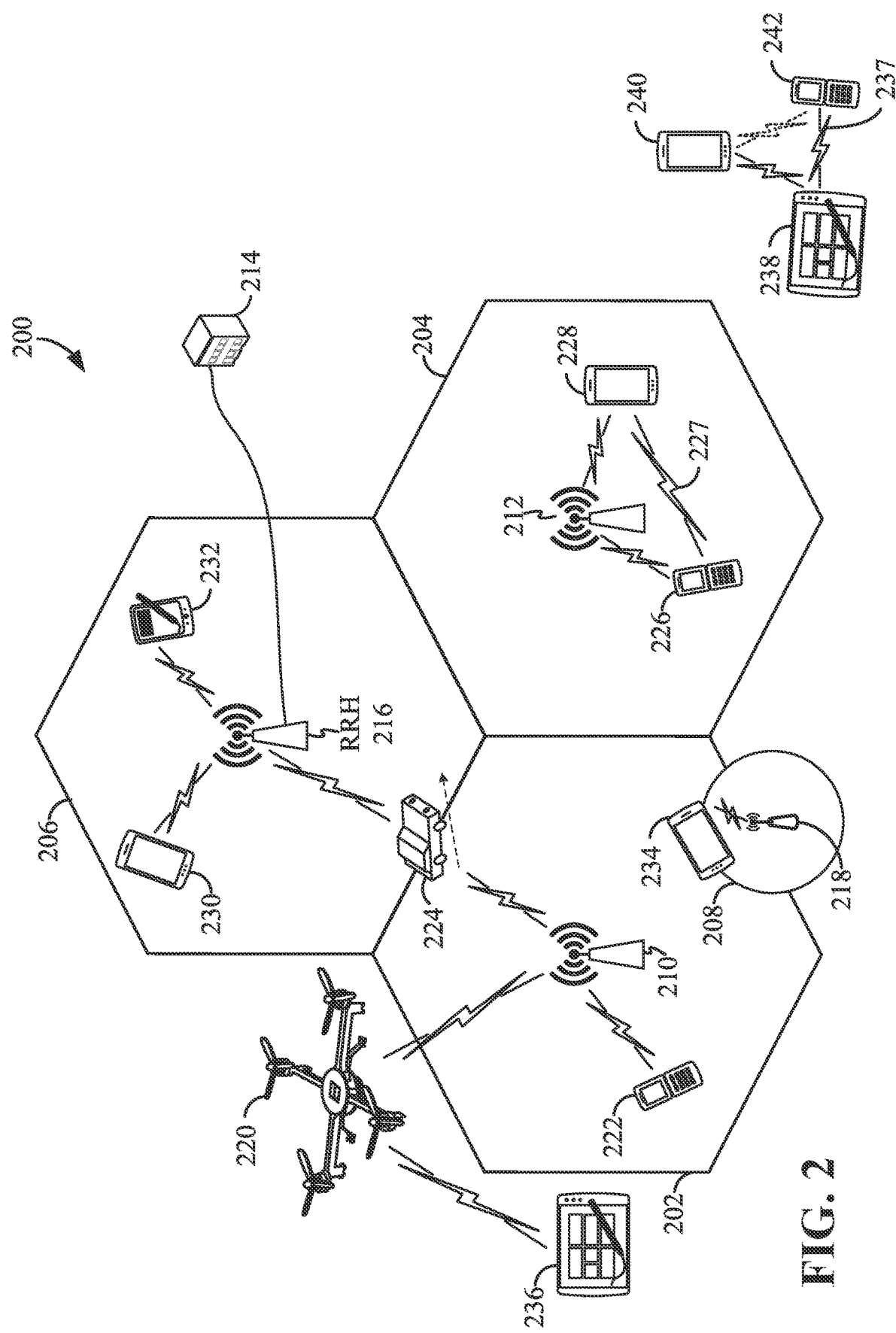
FIG. 2 is an illustration of an example of a radio access network according to some aspects.

FIG. 2 is an illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the RAN are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if the signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on the physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
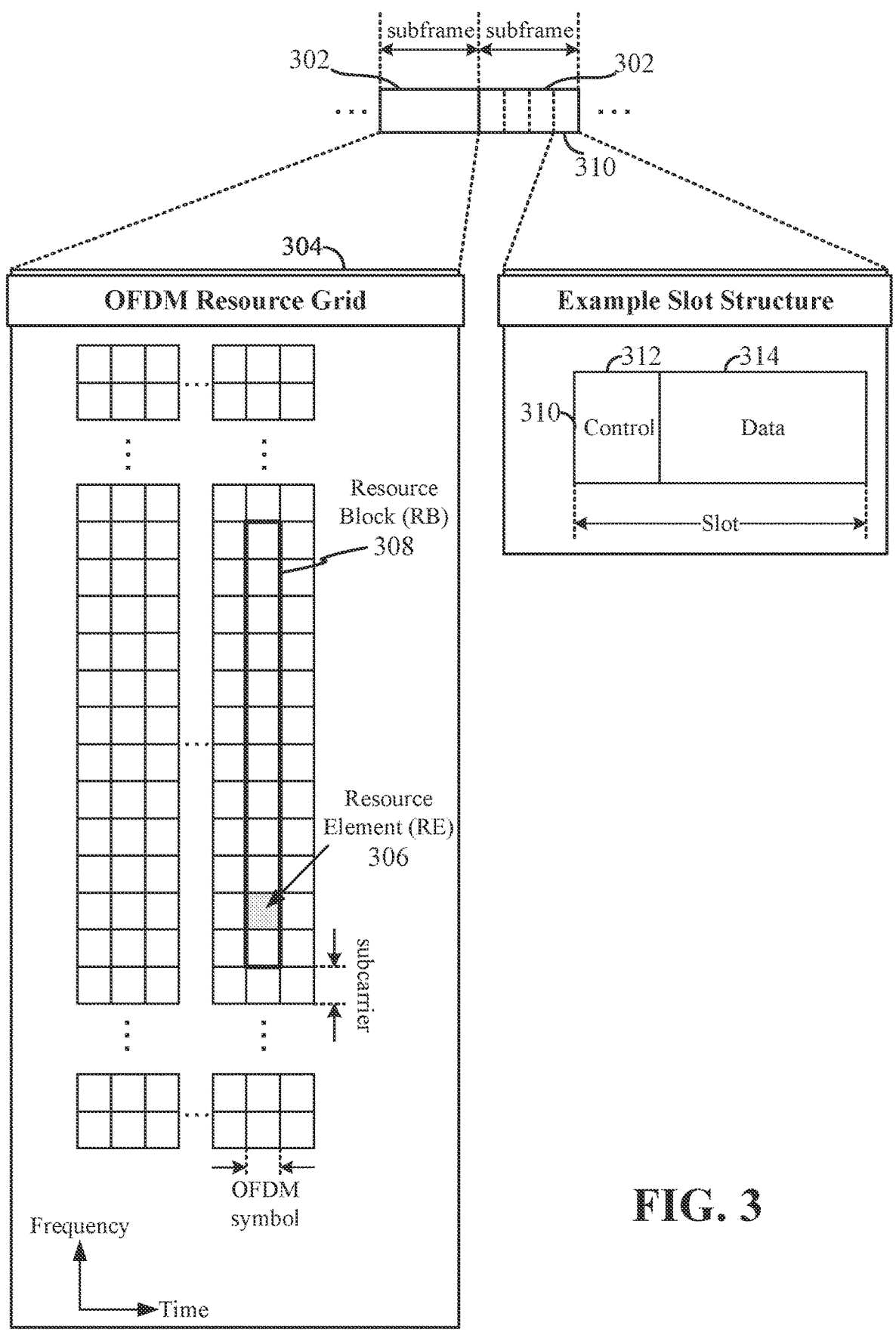
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time—frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the MAC layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Figure 4:
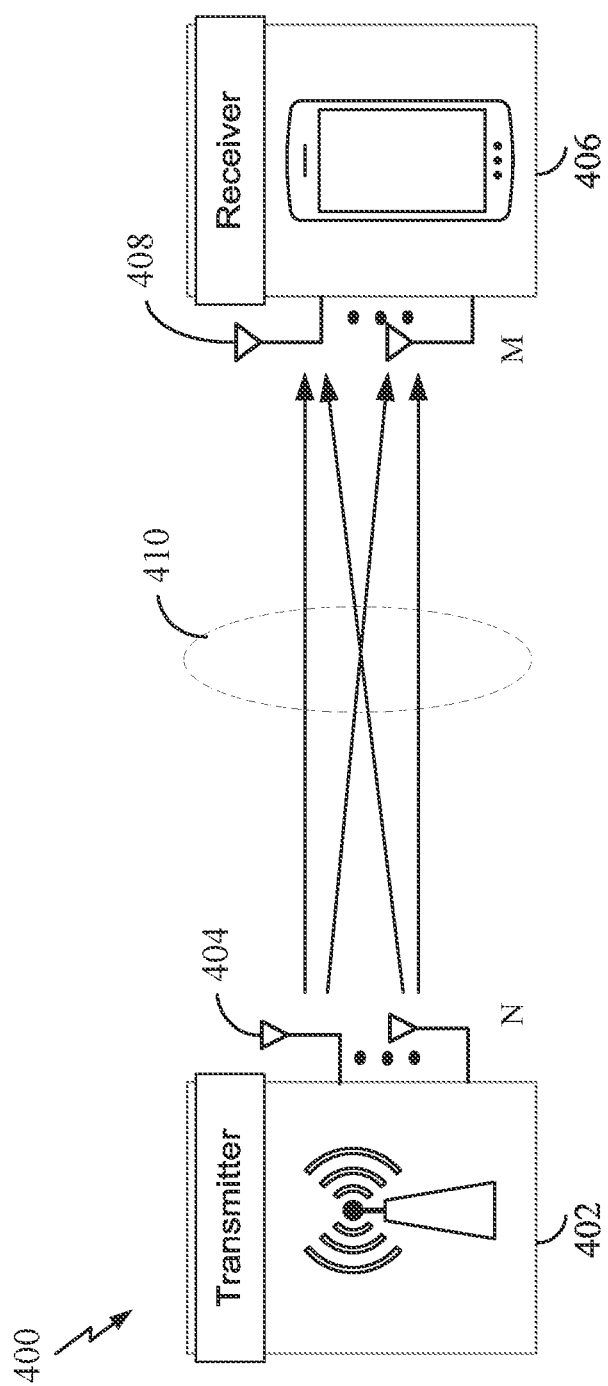
FIG. 4 is a block diagram illustrating a wireless communication system supporting multiple-input multiple-output (MIMO) communication according to some aspects.

In some aspects of the disclosure, the scheduling entity (e.g., base station) and/or scheduled entity (e.g., UE) may be configured for beamforming and/or multiple-input multiple-output (MIMO) technology. FIG. 4 illustrates an example of a wireless communication system 400 supporting MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity 108, a scheduled entity 106, TRP, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G NR systems, particularly for FR2 (e.g., millimeter wave) systems, beamformed signals may be utilized for most downlink channels, including the PDCCH and PDSCH. In addition, broadcast control information, such as the synchronization signal block (SSB), slot format indicator (SFI), and paging information, may be transmitted in a beam-sweeping manner to enable all scheduled entities (UEs) in the coverage area of a network entity (e.g., a base station, gNB, or TRP) to receive the broadcast control information. In addition, for UEs configured with beamforming antenna arrays, beamformed signals may also be utilized for uplink channels, including the PUCCH and PUSCH. In addition, beamformed signals may further be utilized in D2D systems, such as NR sidelink (SL) or V2X, utilizing FR2.

Figure 5:
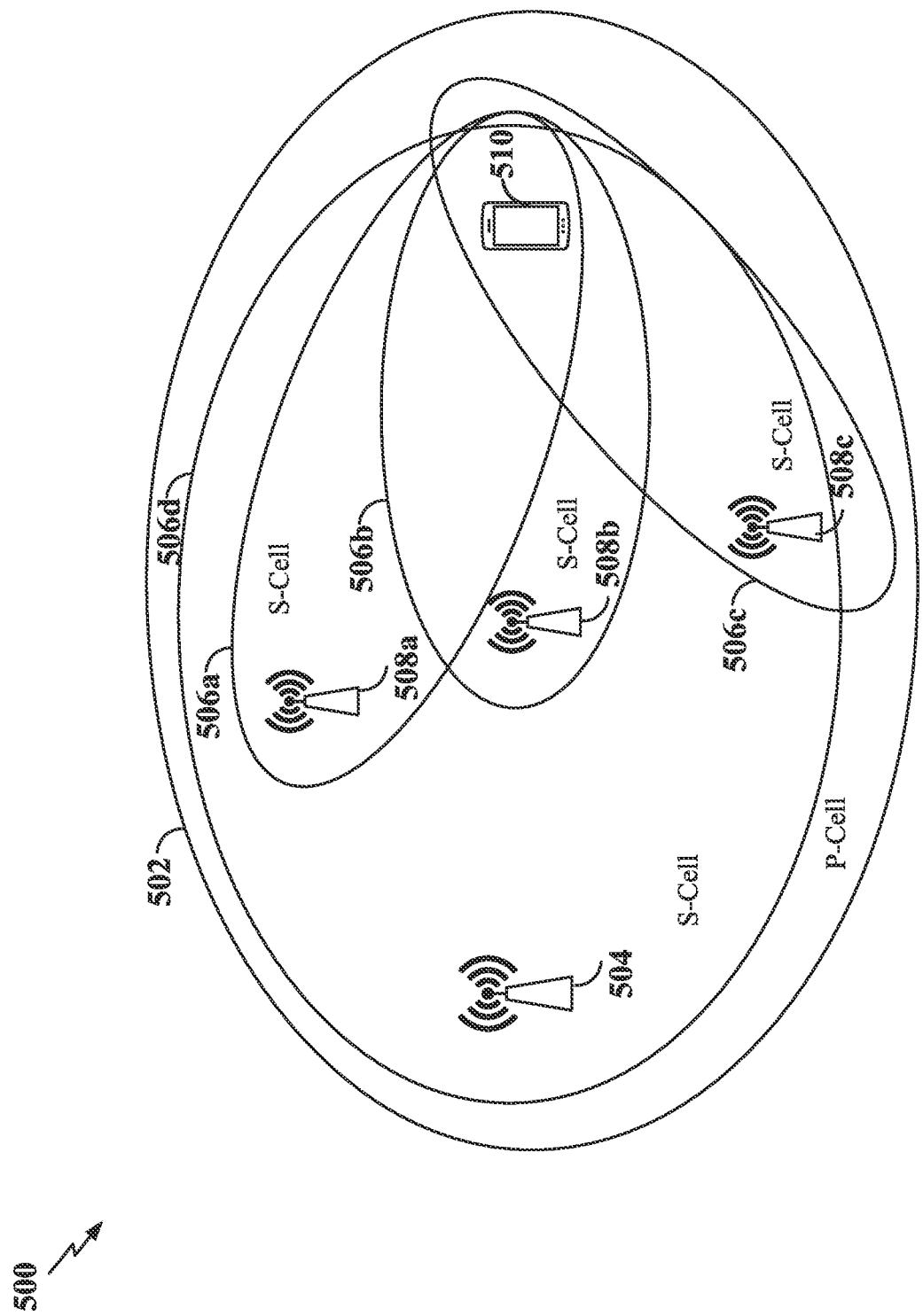
FIG. 5 is a diagram illustrating an example of a multiple transmission and reception points environment according to some aspects.

FIG. 5 is a diagram illustrating an example of a multi-TRP environment 500 according to some aspects. The multi-TRP environment 500 includes a plurality of cells 502 and 506a-506d. In some examples, one of the cells 502 may be considered a primary serving cell (PCell) 502 and the remaining cells 506a, 506b, 506c, and 506d may be considered secondary serving cells (SCells). The PCell 502 may be referred to as the anchor cell that provides a radio resource control (RRC) connection to the UE. In some examples, the PCell and one or more of the SCells may be collocated (e.g., different TRPs at the same geographical location and coupled to the same antenna tower/pole).

When carrier aggregation is configured, one or more of the SCells 506a-506d may be activated or added to the PCell 502 to form the serving cells serving a user equipment (UE) 510. Each serving cell or its TRP corresponds to a component carrier (CC). The CC of the PCell 502 may be referred to as a primary CC, and the CC of an SCell 506a-506d may be referred to as a secondary CC. The PCell 502 and one or more of the SCells 506 may be served by a respective TRP 504 and 508a-508c. In the example shown in FIG. 5, SCells 506a-506c are each served by a respective non-collocated TRP 508a-508c. However, SCell 506d is collocated with the PCell 502. Thus, TRP 504 may include two collocated TRPs, each supporting a different carrier. For example, TRP 504 may correspond to a network entity including multiple collocated TRPs. The coverage of the PCell 502 and SCell 506d may differ since different component carriers (which may be in different frequency bands) may experience different path loss and/or interference.

In some examples, the PCell 502 may add or remove one or more of the SCells 506a-506d to improve the reliability of the connection to the UE 510 and/or increase the data rate. The PCell 502 may be changed upon a handover to another PCell. In some aspects of the disclosure, PCell change may be performed using L1 and L2 centric signaling, as well as layer 3 (L3) signaling (e.g., RRC signaling).

In some examples, one of the cells (e.g., cell 502) may be a low band cell, and another cell (e.g., cell 506d) may be a high band cell. A low band cell uses a carrier frequency in a frequency band lower than that of the high band cells. For example, the high band cell may use a high band mmWave carrier (e.g., FR4-a or FR4-1 or above), and the low band cell may use a low band mmWave carrier (e.g., FR2). In this example, carrier aggregation may not be performed between the cells 502 and 506d, depending on whether carrier aggregation across frequency bands is supported. In addition, when using mmWave carriers (FR2 or above), beamforming may be used to transmit and receive signals.

Figure 6:
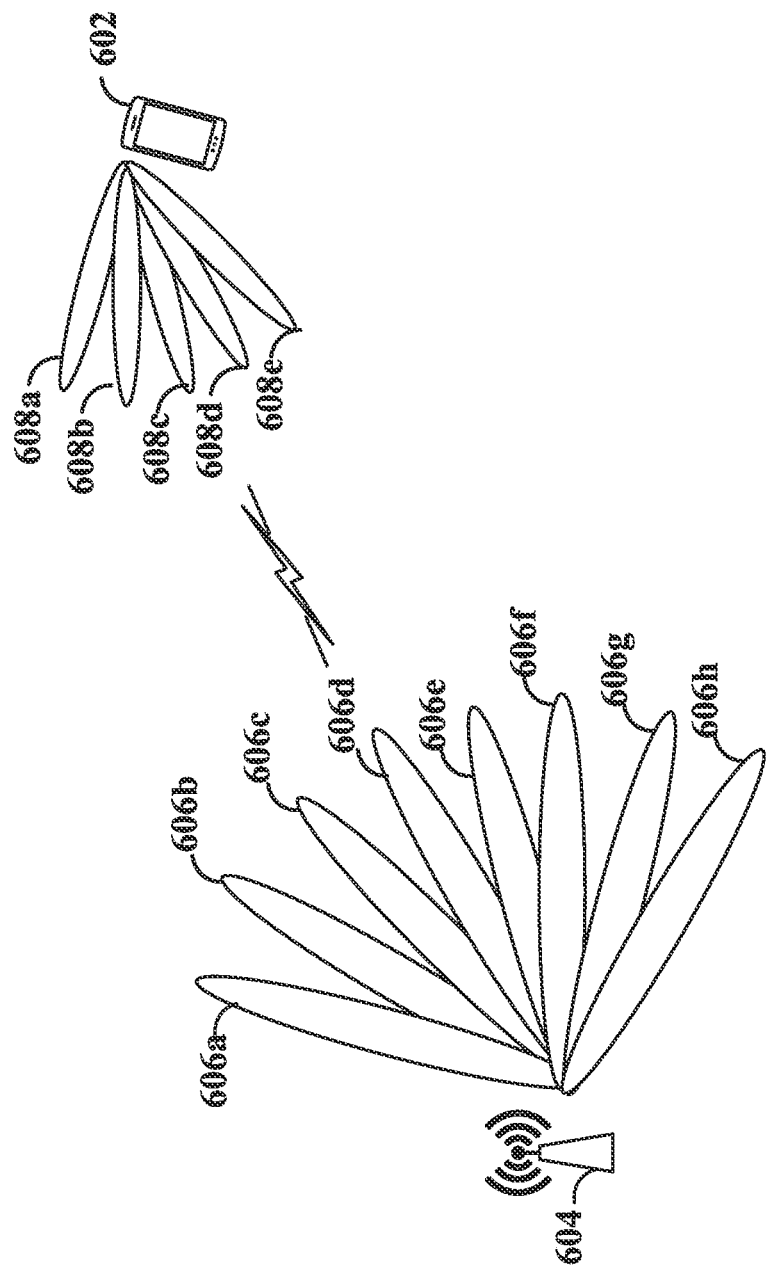
FIG. 6 is a diagram illustrating communication between a transmission and reception point and a user equipment using beamformed signals according to some aspects.

FIG. 6 is a diagram illustrating communication between a network entity 604 and a UE 602 using beamformed signals according to some aspects. The network entity 604 may be any of the base stations (e.g., gNBs) or scheduling entities illustrated in FIGS. 1, 2, and/or 5, and the UE 602 may be any of the UEs or scheduled entities illustrated in FIGS. 1, 2, and/or 5.

The network entity 604 may generally be capable of communicating with the UE 602 using one or more transmit beams, and the UE 602 may further be capable of communicating with the network entity 604 using one or more receive beams. As used herein, the term transmit beam refers to a beam on the network entity 604 that may be utilized for downlink or uplink communication with the UE 602. In addition, the term receive beam refers to a beam on the UE 602 that may be utilized for downlink or uplink communication with the network entity 604.

In the example shown in FIG. 6, the network entity 604 is configured to generate a plurality of transmit beams 606a-606h, each associated with a different spatial direction. In addition, the UE 602 is configured to generate a plurality of receive beams 608a-608e, each associated with a different spatial direction. It should be noted that while some beams are illustrated as adjacent to one another, such an arrangement may be different in different aspects. For example, transmit beams 606a-606h transmitted during a same symbol may not be adjacent to one another. In some examples, the network entity 604 and UE 602 may each transmit more or less beams distributed in all directions (e.g., 360 degrees) and in three-dimensions. In addition, the transmit beams 606a-606h may include beams of varying beam width. For example, the network entity 604 may transmit certain signals (e.g., SSBs) on wider beams and other signals (e.g., CSI-RSs) on narrower beams.

The network entity 604 and UE 602 may select one or more transmit beams 606a-606h on the network entity 604 and one or more receive beams 608a-608e on the UE 602 for communication of uplink and downlink signals therebetween using a beam management procedure. In one example, during initial cell acquisition, the UE 602 may perform a P1 beam management procedure to scan the plurality of transmit beams 606a-606h on the plurality of receive beams 608a-608e to select a beam pair link (e.g., one of the transmit beams 606a-606h and one of the receive beams 608a-608e) for a physical random access channel (PRACH) procedure for initial access to the cell. For example, periodic SSB beam sweeping may be implemented on the network entity 604 at certain intervals (e.g., based on the SSB periodicity). Thus, the network entity 604 may be configured to sweep or transmit an SSB on each of a plurality of wider transmit beams 606a-606h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the network entity 604 and UE 602 may perform a P2 beam management procedure for beam refinement at the network entity 604. For example, the network entity 604 may be configured to sweep or transmit a CSI-RS on each of a plurality of narrower transmit beams 606a-606h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). The UE 602 is configured to scan the plurality of CSI-RS transmit beams 606a-606h on the plurality of receive beams 608a-608e. The UE 602 then performs beam measurements (e.g., RSRP, SINR, etc.) of the received CSI-RSs on each of the receive beams 608a-608e to determine the respective beam quality of each of the CSI-RS transmit beams 606a-606h as measured on each of the receive beams 608a-608e.

The UE 602 can then generate and transmit a Layer 1 (L1) measurement report, including the respective beam index (e.g., CSI-RS resource indicator (CRI)) and beam measurement (e.g., RSRP or SINR) of one or more of the CSI-RS transmit beams 606a-606h on one or more of the receive beams 608a-608e to the network entity 604. The network entity 604 may then select one or more CSI-RS transmit beams on which to communicate downlink and/or uplink control and/or data with the UE 602. In some examples, the selected CSI-RS transmit beam(s) have the highest RSRP from the L1 measurement report. Transmission of the L1 measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 602 may further select a corresponding receive beam on the UE 602 for each selected serving CSI-RS transmit beam to form a respective beam pair link (BPL) for each selected serving CSI-RS transmit beam. For example, the UE 602 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the network entity 604 may configure the UE 602 to perform SSB beam measurements and provide an L1 measurement report containing beam measurements of SSB transmit beams 606a-606h. For example, the network entity 604 may configure the UE 602 to perform SSB beam measurements and/or CSI-RS beam measurements for beam failure detection (BRD), beam failure recovery (BFR), cell reselection, beam tracking (e.g., for a mobile UE 602 and/or network entity 604), or other beam optimization purpose.

In addition, when the channel is reciprocal, the transmit and receive beams may be selected using an uplink beam management scheme. In an example, the UE 602 may be configured to sweep or transmit on each of a plurality of receive beams 608a-608e. For example, the UE 602 may transmit an SRS on each beam in different beam directions. In addition, the network entity 604 may be configured to receive the uplink beam reference signals on a plurality of transmit beams 606a-606h. The network entity 604 then performs beam measurements (e.g., RSRP, SINR, etc.) of the beam reference signals on each of the transmit beams 606a-606h to determine the respective beam quality of each of the receive beams 608a-608e as measured on each of the transmit beams 606a-606h.

The network entity 604 may then select one or more transmit beams on which to communicate downlink and/or uplink control and/or data with the UE 602. In some examples, the selected transmit beam(s) have the highest RSRP. The UE 602 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 606d) on the network entity 604 and a single receive beam (e.g., beam 608c) on the UE may form a single BPL used for communication between the network entity 604 and the UE 602. In another example, multiple CSI-RS transmit beams (e.g., beams 606c, 606d, and 606e) on the network entity 604 and a single receive beam (e.g., beam 608c) on the UE 602 may form respective BPLs used for communication between the network entity 604 and the UE 602. In another example, multiple CSI-RS transmit beams (e.g., beams 606c, 606d, and 606e) on the network entity 604 and multiple receive beams (e.g., beams 608c and 608d) on the UE 602 may form multiple BPLs used for communication between the network entity 604 and the UE 602. In this example, a first BPL may include transmit beam 606c and receive beam 608c, a second BPL may include transmit beam 608d and receive beam 608c, and a third BPL may include transmit beam 608e and receive beam 608d.

The radio protocol architecture for a radio access network, such as the RAN 104 shown in FIG. 1 and/or the RAN 200 shown in FIG. 2, may take on various forms depending on the particular application. An example of a radio protocol architecture for the user and control planes is illustrated in FIG. 7.

Figure 7:
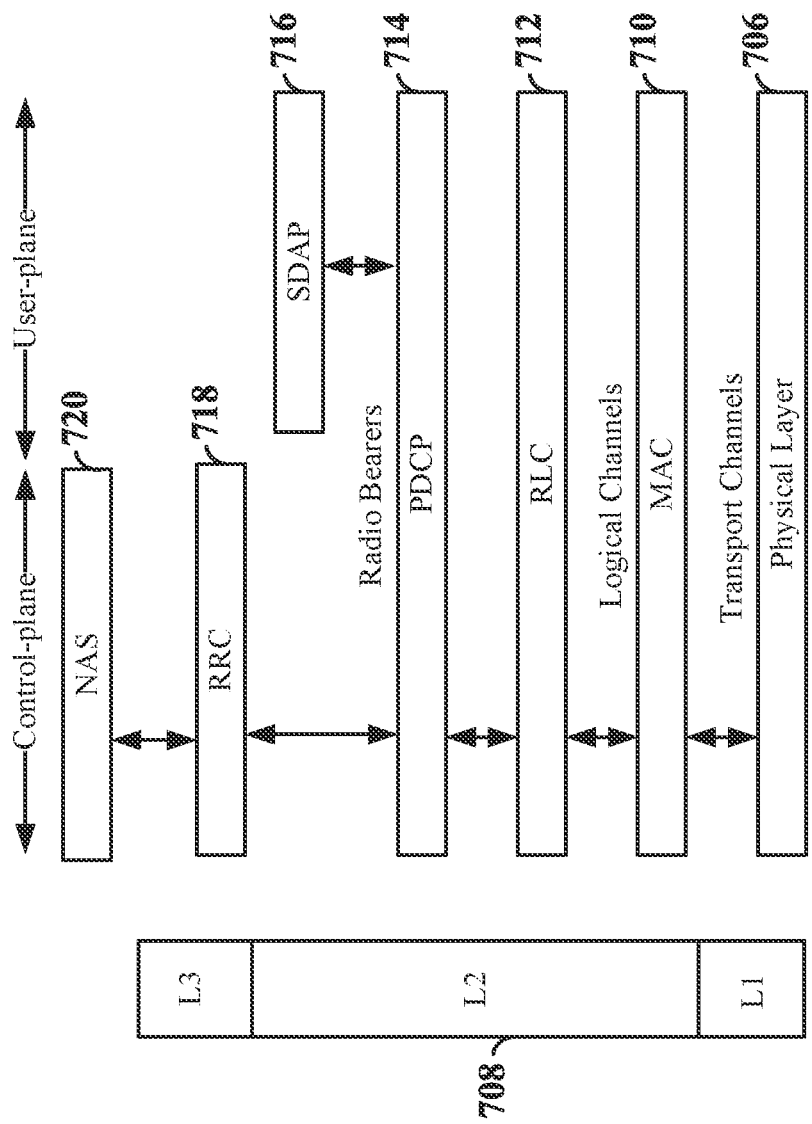
FIG. 7 is a diagram illustrating a radio protocol architecture for wireless communication according to some aspects.

As illustrated in FIG. 7, the radio protocol architecture for a UE and a base station (e.g., gNB) includes three layers: layer 1 (L1), layer 2 (L2), and layer 3 (L3). L1 is the lowest layer and implements various physical layer signal processing functions. L1 will be referred to herein as the physical layer 706. L2 708 is above the physical layer 706 and is responsible for the link between the UE and base station over the physical layer 706.

In the user plane, the L2 layer 708 includes a media access control (MAC) layer 710, a radio link control (RLC) layer 712, a packet data convergence protocol (PDCP) 714 layer, and a service data adaptation protocol (SDAP) layer 716, which are terminated at the base station on the network side. Although not shown, the UE may have several upper layers above the L2 layer 708 including at least one network layer (e.g., Internet protocol (IP) layer and user data protocol (UDP) layer) that is terminated at the User Plane Function (UPF) on the network side and one or more application layers.

The SDAP layer 716 provides a mapping between a 5G core (5GC) quality of service (QoS) flow and a data radio bearer and performs QoS flow ID marking in both downlink and uplink packets. The PDCP layer 714 provides packet sequence numbering, in-order delivery of packets, retransmission of PDCP protocol data units (PDUs), and transfer of upper layer data packets to lower layers. PDU's may include, for example, Internet Protocol (IP) packets, Ethernet frames, and other unstructured data (i.e., Machine-Type Communication (MTC), hereinafter collectively referred to as "packets"). The PDCP layer 714 also provides header compression for upper layer data packets to reduce radio transmission overhead, security by ciphering the data packets, and integrity protection of data packets. A PDCP context may indicate whether PDCP duplication is utilized for a unicast connection.

The RLC layer 712 provides segmentation and reassembly of upper layer data packets, error correction through automatic repeat request (ARQ), and sequence numbering independent of the PDCP sequence numbering. An RLC context may indicate whether an acknowledged mode (e.g., a reordering timer is used) or an unacknowledged mode is used for the RLC layer 712. The MAC layer 710 provides multiplexing between logical and transport channels. The MAC layer 710 is also responsible for allocating the various radio resources (e.g., resource blocks) in one cell among the UEs and for HARQ operations. A MAC context may enable, for example, a HARQ feedback scheme, resource selection algorithms, carrier aggregation, beam failure recovery, or other MAC parameters for a unicast connection. The physical layer 706 is responsible for transmitting and receiving data on physical channels (e.g., within slots). A PHY context may indicate a transmission format and a radio resource configuration (e.g., bandwidth part (BWP), numerology, etc.) for a unicast connection.

In the control plane, the radio protocol architecture for the UE and base station is substantially the same for L1 706 and L2 708 with the exception that there is no SDAP layer in the control plane and there is no header compression function for the control plane. The control plane also includes a radio resource control (RRC) layer 718 in L3 and a higher Non Access Stratum (NAS) layer 720. The RRC layer 718 is responsible for establishing and configuring signaling radio bearers (SRBs) and data radio bearers (DRBs) between the base station the UE, paging initiated by the 5GC or NG-RAN, and broadcast of system information related to Access Stratum (AS) and Non Access Stratum (NAS). The RRC layer 718 is further responsible for QoS management, mobility management (e.g., handover, cell selection, inter-RAT mobility), UE measurement and reporting, and security functions. The NAS layer 720 is terminated at the access and mobility management function (AMF) in the core network and performs various functions, such as authentication, registration management, and connection management.

L1-L2 Centric Network Mobility

In a 5G NR network, inter-cell mobility can be beam-based according to some aspects of the disclosure. In beam-based mobility, a UE can switch to a beam (e.g., for control and/or data) from a network entity with a physical cell identity (PCI) that can be different from that of the current serving network entity. In some aspects, inter-cell mobility can be performed using L1 and L2 centric signaling that switches UE-dedicated channels and/or reference signals to a new network entity (e.g., a TRP or gNB of a different PCell) with a different PCI according to an L1-L2 (e.g., DCI and/or MAC-CE) based unified transmission configuration indication (TCI) update. A TCI update can indicate a beam for a target channel/signal (e.g., PDCCH, PDCCH, CSI-RS) to be received by the UE. The TCI can include a source reference signal (RS) and an intended quasi co-location (QCL) type to be applied at the UE.

Figure 8:
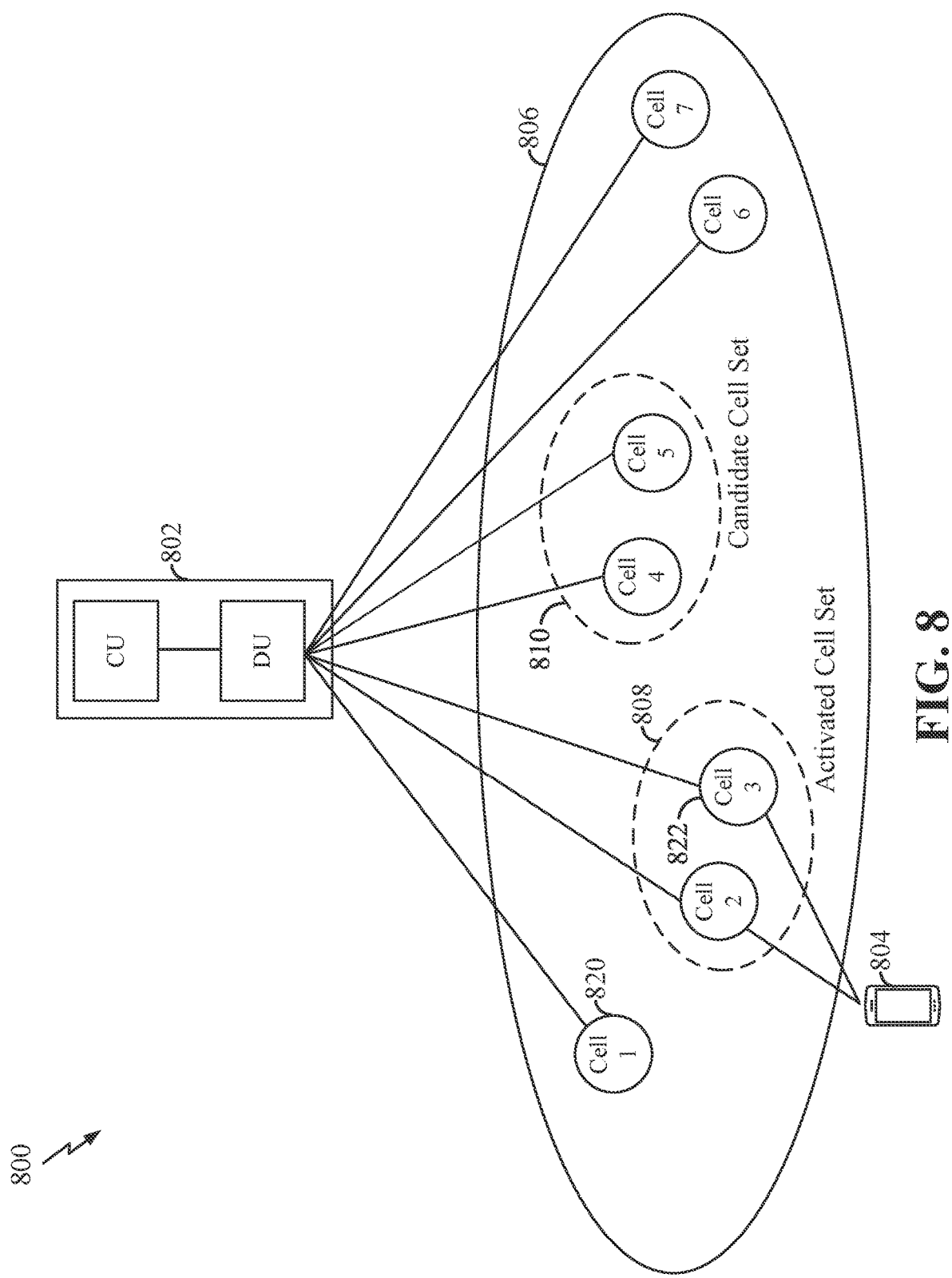
FIG. 8 is a diagram illustrating a communication network configured for layer 1 and layer 2 (L1-L2) centric mobility according to some aspects.

FIG. 8 is a diagram illustrating an exemplary communication network 800 configured for L1-L2 centric mobility according to some aspects. A network entity 802 and a UE 804 can configure a set of cells (e.g., cell set 806) for L1-L2 centric mobility. In some aspects, the network entity 802 may be implemented as an aggregated base station or a disaggregated base station. In a disaggregated base station architecture, the network entity may include one or more of a central unit (CU), a distributed unit (DU), or a radio unit (RU). In one example, the network entity 802 can use L3 signaling (e.g., RRC) to configure the cells for L1-L2 centric mobility. In L1-L2 centric mobility, a UE can switch or hand over between cells or network entities using L1 and L2 signaling, without using L3 signaling. In the exemplary network 800, the base station (e.g., a gNB) can be divided into different physical and/or functional entities named a centralized unit (CU or gNB-CU) and a distributed unit (DU or gNB-DU). The CU provides support for the higher layers of the protocol stack such as SDAP, PDCP, and RRC while the DU provides support for the lower layers of the protocol stack such as RLC, MAC, and physical layer. A gNB can have a single CU that can control one or more DUs. Each DU can support one or more cells (e.g., the cell set 806). The interface between a CU and a DU is named the F1 interface, for example, as per 3GPP specification.

The L1-L2 mobility configured cell set 806 can include a set of cells (e.g., L1-L2 mobility activated cell set 808) that are activated for L1-L2 Mobility. Any cells in the activated cell set 808 can be readily used for data and control transfer in cell handover using L1-L2 centric signaling. The other cells (e.g., cells 1, 6, and 7) in the set of cells 806 can be grouped in a L1-L2 mobility deactivated cell set and are deactivated for L1-L2 mobility operations. Any cells in the L1-L2 mobility deactivated cell set can be readily activated using L1-L2 signaling.

In some aspects, the network and the UE 804 can use L1-L2 centric signaling to activate/deactivate the cells in the cell set 806 and to select communication beams within the activated cell(s). As the UE 804 moves around among the cells, the cells in the cell set 806 can be deactivated or activated by L1-L2 centric signaling, for example, based on the signal quality, cell loading, etc. In some aspects, the signal quality can be qualified in cell level and/or beam level. In one example, beam level signal quality can be indicated from L1 measurements (e.g., L1-RSRP, L1-SINR), and cell level quality can be indicated from average beam quality, etc. In some aspects, the cells in the cell set 806 can be associated with the same or different DUs of the network entity 802.

In some aspects, the network entity 802 may configure a subset of the deactivated cells as a candidate cell set 810 that the UE can autonomously add to the activated cell set based on various criteria. In one example, the UE can autonomously add a cell (e.g., cell 4 or cell 5) of the candidate cell set 810 to the activated cell set based on the measured channel quality of the cell. In one example, the UE can autonomously add a cell of the candidate cell set 810 to the activated cell set 808 based on cell loading, signal quality, etc. The UE can report the autonomously added cell to the network entity, for example, using UCI. In some aspects, the network entity 802 can support multiple component carriers, and each cell can be configured to communicate using a corresponding component carrier (CC). The network entity can activate or deactivate the CCs in groups (cells).

In some aspects, L1-L2 centric inter-cell mobility involves PCell management. For example, L1-L2 signaling can be used to change the PCell within the activated cell set 808. When the UE switches (e.g., handover) to a new PCell 820 (e.g., cell 1) that is not currently in the activated cell set 806 configured for L1-L2 mobility, L3 mobility can be used to change PCell (e.g., RRC signaled handover). For example, the network entity 802 can use RRC signaling to update the set of cells configured for L1-L2 centric mobility during an L3 handover.

Figure 9:
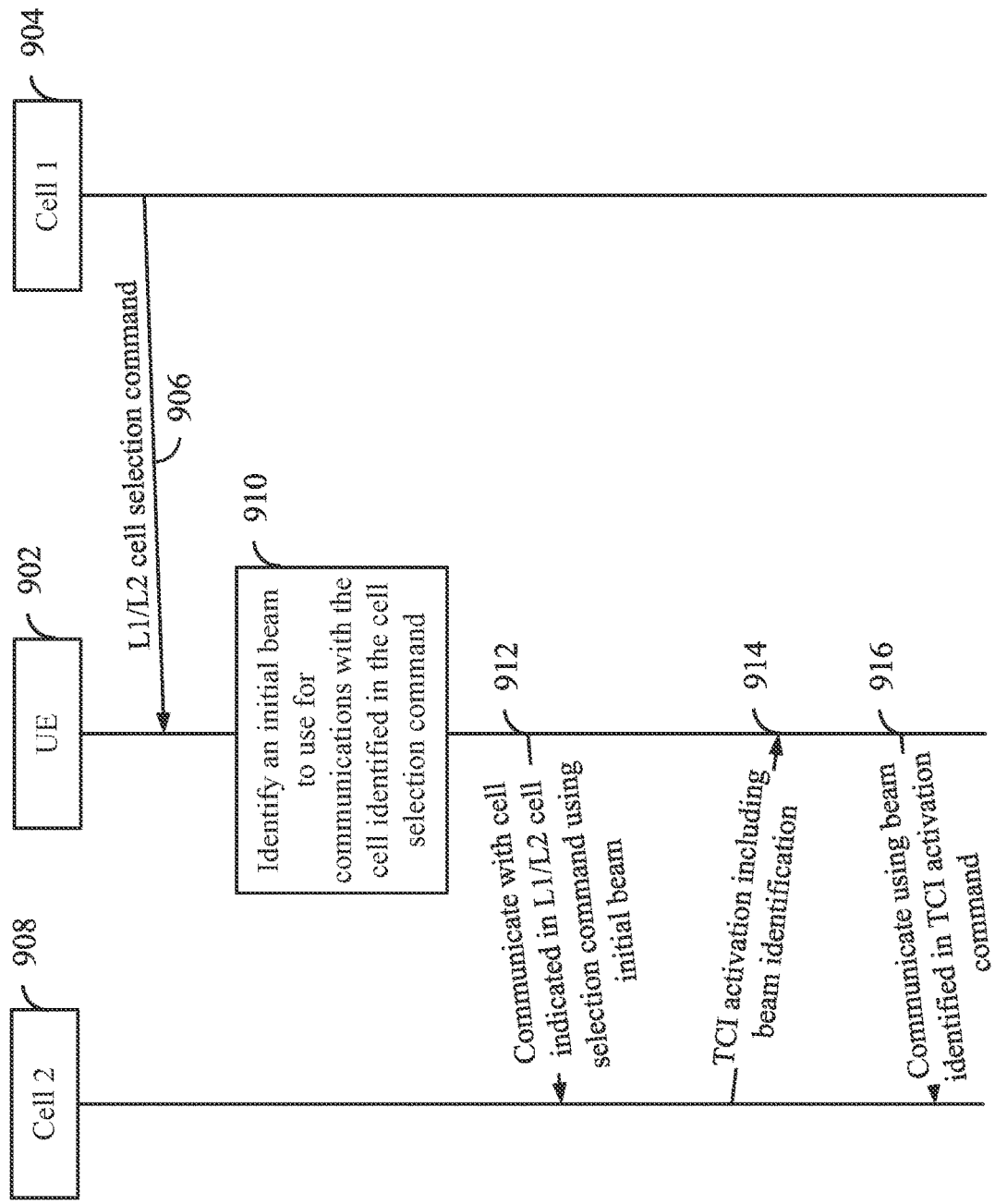
FIG. 9 is a call flow diagram illustrating an example of selecting an initial beam to use in a cell set configured for L1-L2 centric mobility according to some aspects.

FIG. 9 is a call flow diagram illustrating an exemplary process for selecting an initial beam to use in a cell set 806 configured for L1-L2 centric mobility. For example, a UE 902 can receive L1-L2 mobility commands from a first cell 904 (e.g., cell 1). In one example, the UE 902 can receive an L1-L2 cell selection command 906 from the first cell 904. The L1-L2 cell selection command (e.g., DCI or MAC CE) can identify a new cell 908 (e.g., cell 2) that the UE is to communicate with. In this example, the UE 902 and cells 904 and 908 may correspond to the UE and cells described above in FIG. 8.

At 910, based on the L1-L2 cell selection command, the UE can identify an initial beam to use for communicating with the second cell (e.g., cell 2) identified in the cell selection command. In some examples, the initial beam can be determined based on signal quality (e.g., L1 measurements) generated prior to receipt of the L1-L2 cell selection command 906, based on explicit indications in the L1-L2 cell selection command, or implicitly based on the best-reported reference signal in the most recent L1 measurement report generated prior to receipt of the L1-L2 cell selection command. At 912, the UE can then communicate with the cell indicated in the L1-L2 cell selection command using the initial beam.

At 914, at some later point in time, the UE may receive, from the second cell 908, a TCI activation command including a beam identification. At 916, the UE can subsequently communicate with the second cell using the beam identified in the TCI activation command. In L1-L2 based mobility, the default beam (e.g., PDSCH beam) may be selected based on various operating modes. In some aspects, different cells (e.g., PCells and SCells) may be configured with different PCIs. The network entity of the serving cell can use one PCI configured for the serving cell and transmit the full set of SSB IDs, and L1-L2 signaling (e.g., a DCI or MAC-CE) can select which cell(s) or corresponding PCI(s) and/or SSB(s) to serve the UE based on signal quality (e.g., RSRP) per reported SSB ID per reported PCI. In some aspects, each serving cell may be configured with a single PCI. L1-L2 signaling can select the serving cell(s) or corresponding serving cell ID(s) to serve the UE based on signal quality metrics per reported SSB ID per reported PCI.

Aspects of the present disclosure provide techniques for cell synchronization and timing advance management used in L1-L2 inter-cell mobility. In some aspects, a network entity (e.g., network entity 802) can send a timing advance command (TAC) to a UE to adjust (e.g., advance) the UE's UL transmission timing such that the UL frame can be in alignment with the DL frame in the time domain A timing advance (TA) value depends on the signal propagation delay from the network entity to the UE. Therefore, different UEs located at different locations can have different TA values. The TAC is configured to inform the UE about the amount of time that the UE needs to advance the timing of the UL transmissions. The network entity can use two types of TACs to synchronize UL and DL timing. In one aspect, the network entity can send an initial TAC via a random access channel (RACH) command when the UE initially attaches to a cell (e.g., PCell). The UE can perform the RACH procedure for uplink synchronization and to obtain communication resources. Once the initial cell attachment is completed, the network entity can send TAC to the UE via a MAC-CE, and the UE can adjust its UL timing based on the TAC.

Figure 10:
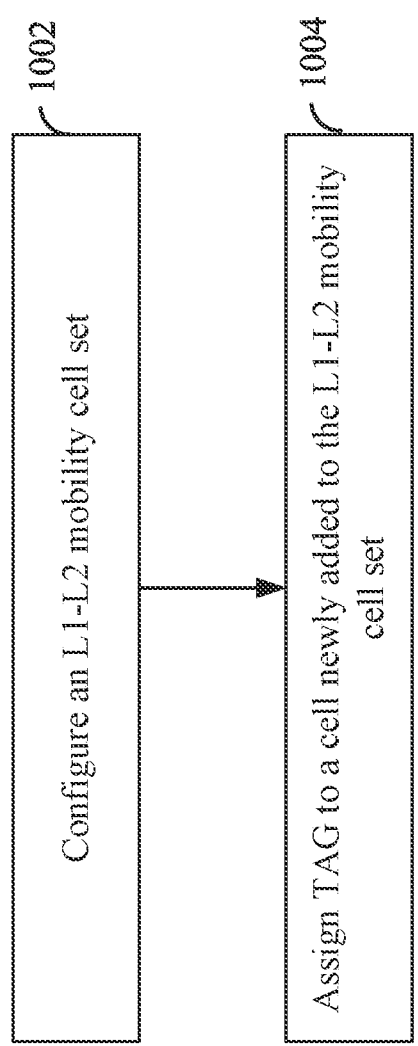
FIG. 10 is a flow chart illustrating a process for configuring an L1-L2 centric mobility cell set according to some aspects.

FIG. 10 is a flow chart illustrating a process for configuring an L1-L2 mobility cell set according to some aspects of the disclosure. For example, the L1-L2 mobility cell set may be the same as the cell set 806 of FIG. 8. At block 1002, the network entity 802 can configure a set of cells for L1-L2 mobility. In some aspects, cells in the L1-L2 mobility configured cell set can be grouped into one or more different timing adjustment groups (TAGs). Each cell in the L1-L2 mobility configured cell set is assigned to a timing adjustment group (TAG). Cells in the same TAG can use the same or similar timing advance (e.g., TA values) for a UE.

At block 1004, when a cell (e.g., SCell) is added to the L1-L2 mobility configured cell set, the newly added cell is assigned to a TAG at the time of addition. For example, the initial TAG assignment can be decided by the serving network entity (e.g., network entity 802). In some aspects, initial TAG assignment can be based on one or more of the frequency band operation, use of repeaters, cell location, UE location, etc. In one example, the new cell can be assigned to a TAG including cells using the same frequency band. In one example, the new cell can be assigned to a TAG including cells using the same repeater(s). In one example, the new cell can be assigned to a TAG including cells located in the same location or proximity. In one example, the new cell can be assigned to a TAG including cell(s) serving the same UE.

Figure 11:
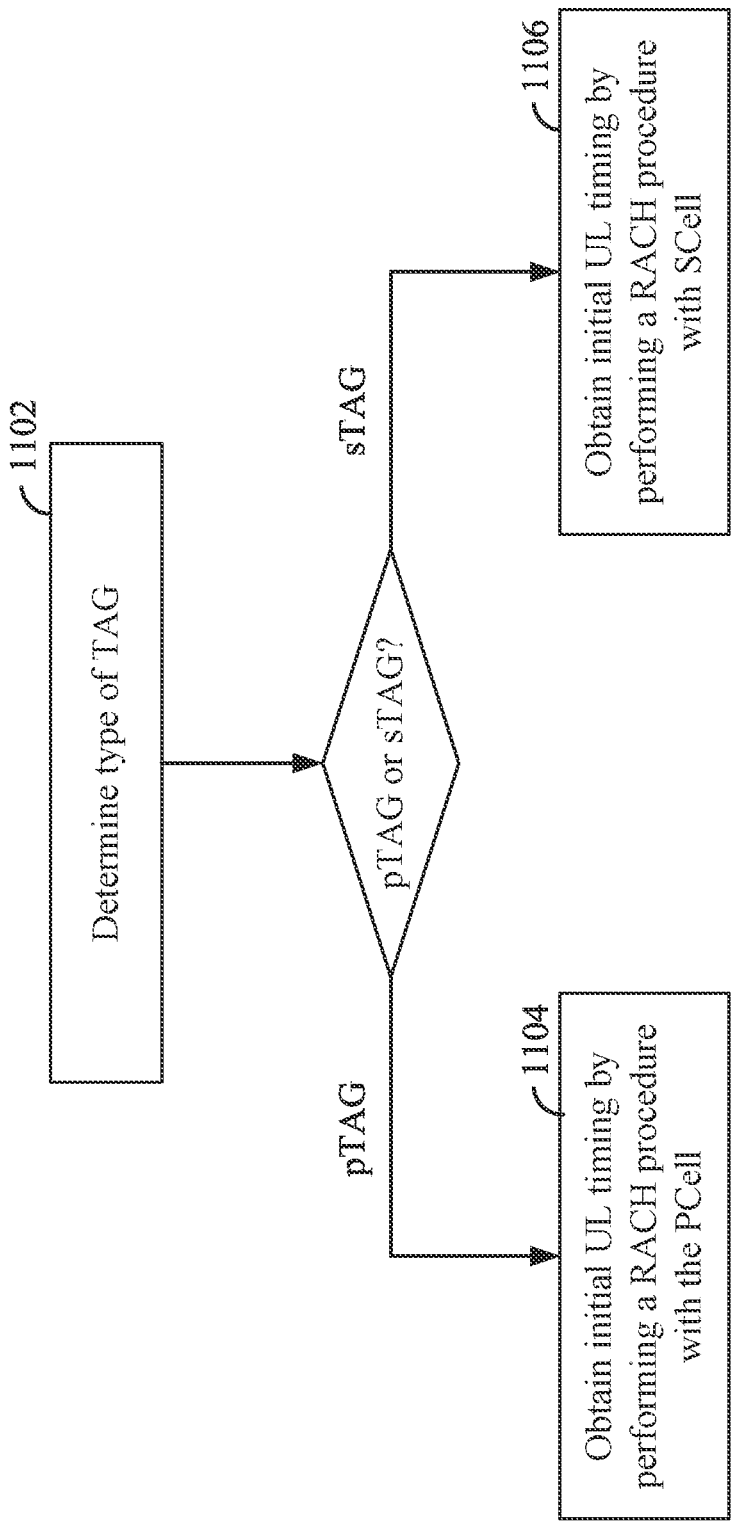
FIG. 11 is a flow chart illustrating a process for obtaining initial uplink timing in a cell set configured for L1-L2 centric mobility according to some aspects.

FIG. 11 is a flow chart illustrating a process for obtaining initial UL timing in an L1-L2 mobility configured cell set according to some aspects. In one example, the cell set may be the cell set 806 in FIG. 8. At 1102, a UE can determine the type of TAG of a cell. A TAG containing a PCell can be called a pTAG, and a TAG containing only SCells can be called an sTAG. The network entity can provide the UE with the TAG information using, for example, DCI/MAC-CE or RRC signaling.

At 1104, if the TAG type is the pTAG, the UE can obtain initial UL timing and synchronization by performing a RACH procedure with the PCell. At 1106, if the TAG type is the sTAG, the UE can obtain initial UL timing and synchronization by performing a RACH procedure with an SCell belonging to the sTAG. For example, the UE can perform a contention-free RACH (CFRA) procedure upon reception of a PDCCH order from a network entity in an SCell. In the CFRA procedure, the preamble is allocated by the network entity (e.g., network entity 802) and provided to the UE. Therefore, there is no preamble conflict. When dedicated resources are insufficient, the network entity can instruct the UE to initiate a contention-based RACH procedure.

Cell Activation/Deactivation of L1-L2 Mobility Configured Cells

Figure 12:
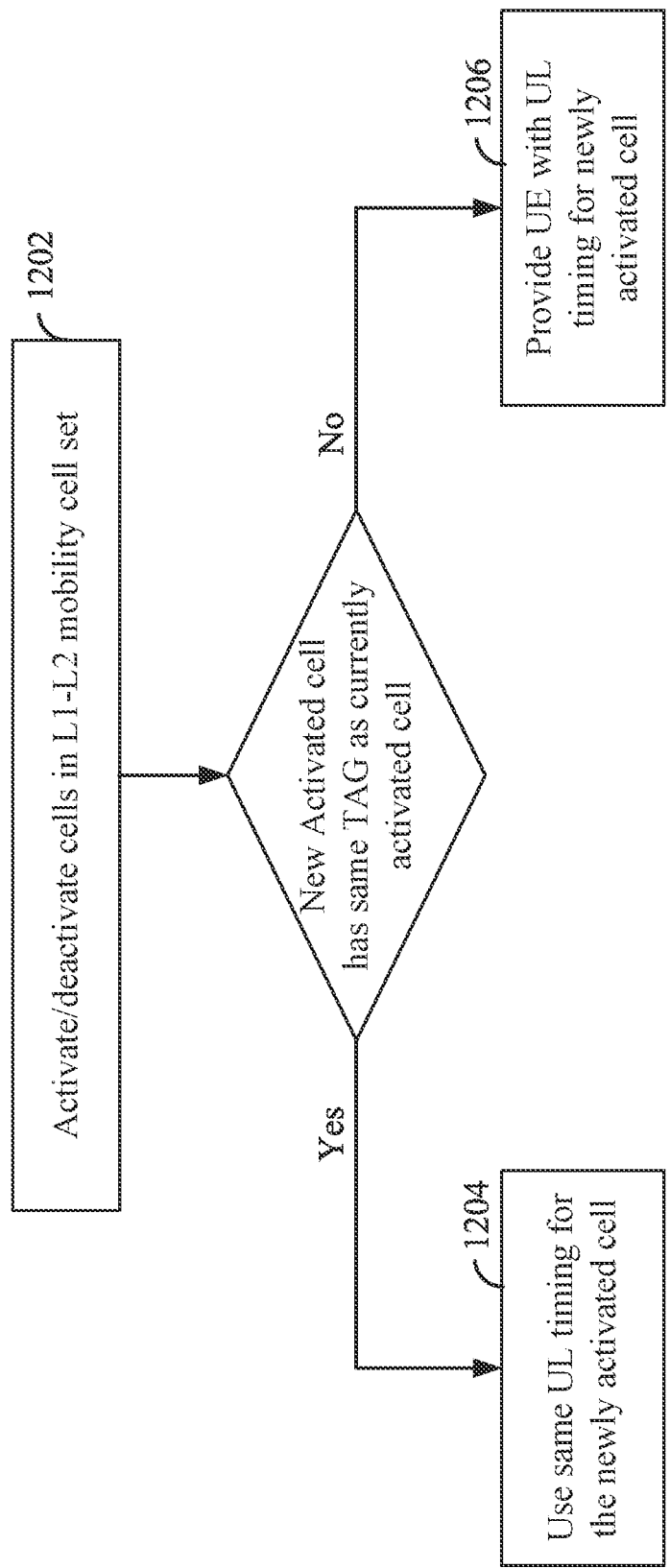
FIG. 12 is a flow chart illustrating a cell synchronization process in a cell set configured for L1-L2 centric mobility according to some aspects.

FIG. 12 is a flow chart illustrating a cell synchronization process in an L1-L2 mobility cell set according to some aspects of the disclosure. At 1202, due to UE (e.g., UE 804) mobility, the cells in the L1-L2 mobility cell set 806 can be activated and/or deactivated by L1-L2 signaling between the network entity 802 and the UE 804. For example, the network entity 802 can activate and/or deactivate one or more cells based on signal quality measurements (e.g., RSRP, received signal strength indicator (RSSI)), cell loading, UE location, etc. In one example, when the UE 804 moves closer to a cell (e.g., cell 820 of FIG. 8), the network entity 802 can activate the cell and add the cell to the activated cell set 808. At the time of cell activation, the new cell (e.g., cell 1) is assigned a TAG by the network entity. The network entity 802 can also deactivate a cell (e.g., cell 822 in FIG. 8) and remove the cell from the activated cell set 808 when the UE 804 moves further away from the cell 822.

At block 1204, if the UE determines that the newly activated cell is included in the same TAG as a currently activated cell (e.g., cell 2), the UE can use the same UL timing for the newly activated call as the other activated cell of the same TAG. At block 1206, if the newly activated cell is in a TAG that has no activated cell, the network entity can provide the UE with the appropriate TA value. For example, the network entity can transmit a TA command to the UE via a TA MAC-CE for the newly activated cell.

In some aspects, the network entity can determine the appropriate TA for the newly activated cell based on timing determined or estimated with respect to other activated cells, cell location, UE location, operating band, and/or UE assistance. In one example, the TA of the newly activated cell can be more advanced or less advanced relative to the cells from different TAGs. In one example, the UE has already synchronized with a cell c1 and a new cell c2 is activated. The UE can measure the DL timing difference between the reference signals (e.g., CSI-RS or SSB) respectively received from cell c1 and cell c2. Then, the UE can estimate the timing advance values of the new cell c2 based on the timing difference between the cells. TA estimation based on DL timing difference, cell location, UE location, operating band, etc. can be a rough estimate. TA refinement may be performed later after a new cell is activated and data/control messages are transmitted on the new cell.

In some aspects, the network entity can use UE assistance to determine the UL timing for the newly activated cell. In one aspect, the UE can report the difference in DL timing reception between different cells (e.g., between PCell (or another synchronized SCell) and deactivated SCells). When a deactivated SCell is activated, the network entity can use the reported DL timing difference to determine the TA of the SCell for the UE. For example, a larger DL timing difference will lead to a larger TA to be assigned to the UE, and vice versa. The network entity can configure the UE to report DL timing differences periodically and/or aperiodically per network entity request. In some aspects, the DL timing difference may be included in channel measurement reports transmitted by the UE. In some aspects, the UE can determine the DL timing difference information based on DL reference signal (e.g., DMRS, CSI-RS, SSB, etc.) measurements (e.g., L1 measurements) of the deactivated cells. In some aspects, the network entity can determine the TA for the cells based on the SRS transmission in the L1-L2 mobility deactivated cells. In some aspects, the network entity can cause (e.g., by a PDCCH order) the UE to perform a RACH procedure (e.g., CFRA procedure) to obtain the UL timing for the newly activated cell. In the above-described L1-L2 mobility cell set, the network entity can apply TA commands to the activated cells in groups (e.g., per TAG).

TAG maintenance of L1-L2 Mobility Configured Cells

Figure 13:
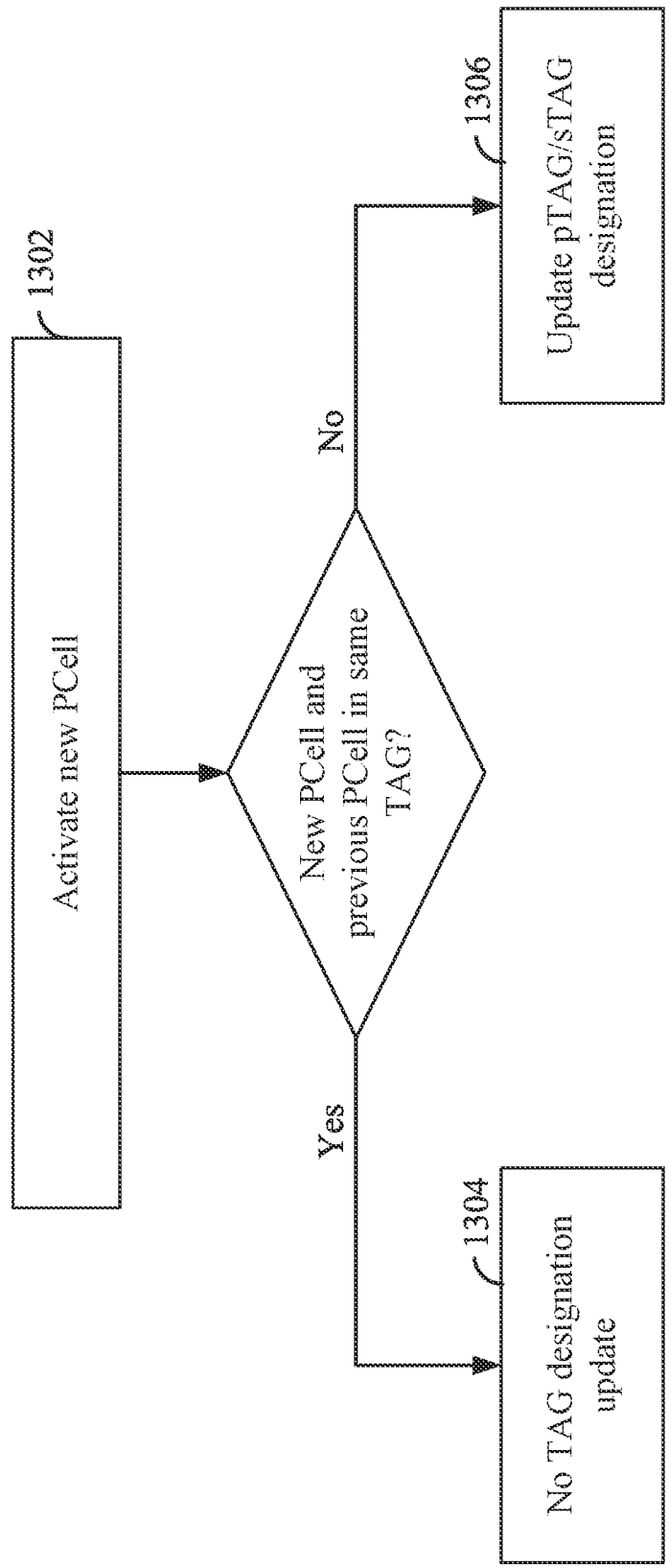
FIG. 13 is a flow chart illustrating a process for timing adjustment group (TAG) maintenance in a cell set configured for L1-L2 centric mobility according to some aspects.

FIG. 13 is a flow chart illustrating a process for TAG maintenance in the L1-L2 mobility configured cell set 806 according to some aspects. As described above, the network entity can activate and/or deactivate cells (e.g., PCell or SCell) due to UE mobility among the cells in the cell set 806.

At 1302, the network entity can activate a new PCell in the L1-L2 mobility configured cell set 806 due to UE mobility. As described above, the network entity assigns the newly activated PCell to a certain TAG. The TAG containing the newly activated PCell becomes the pTAG. At 1304, if the previous PCell and the new PCell belong to the same TAG, there is no TAG designation update. At 1306, if the previous PCell and the new PCell belong to different TAGs, the base station updates TAG designation by switching pTAG and sTAG designations of the TAGs. In one aspect, the base station can signal the TAG designation update to the UE using L1-L2 signaling (e.g., DCI and/or MAC-CE). The UE can perform different RACH procedures to obtain initial UL timing based on the TAG designations. In some aspects, the pTAG designation update can be implicit, for example, based on the active PCell update. For example, the TAG association update of the PCell can trigger pTAG designation update. In some aspects, the TAG association update in the L1-L2 mobility configured cell set may be done by L1-L2 signaling from the base station to the UE, based on the configured set of TAGs for each cell. L1-L2 signaling facilitates faster TAG update to enable faster UE mobility, cell mobility, larger coverage area, higher utilization of repeaters, etc.

Figure 14:
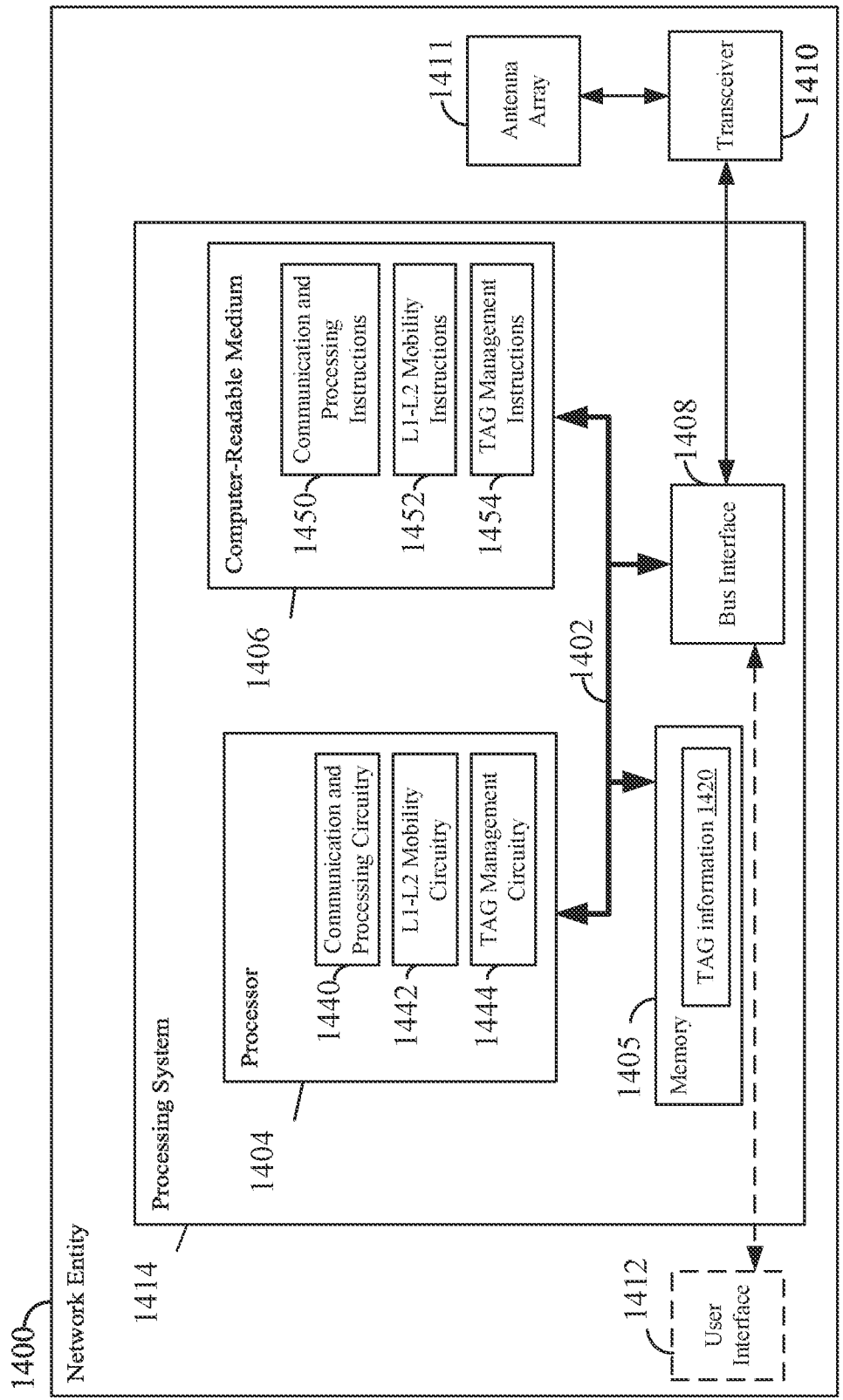
FIG. 14 is a block diagram illustrating an example of a hardware implementation for a scheduling entity according to some aspects.

FIG. 14 is a block diagram illustrating an example of a hardware implementation for a network entity 1400 employing a processing system 1414. For example, the network entity 1400 may be a base station (e.g., TRP, gNB, CU, and/or DU) as illustrated in any one or more of FIGS. 1, 2, 5, 6, 8, and/or 9.

The network entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1400 may be configured to perform any one or more of the functions described herein. That is, the processor 1404, as utilized in a network entity 1400 (e.g., a base station, gNB, CU, or DU), may be used to implement any one or more of the processes and procedures described below and illustrated in FIG. 15.

The processor 1404 may in some instances be implemented via a baseband or modem chip and in other implementations, the processor 1404 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), a memory 1405, and computer-readable media (represented generally by the computer-readable medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a communication interface or means for communicating with various other apparatus over a transmission medium via an antenna array 1411. The transceiver 1410 and the antenna array 1411 can be used for beam-based communication. Depending upon the nature of the apparatus, a user interface 1412 (e.g., keypad, display, speaker, microphone, joystick, touchscreen) may also be provided. Of course, such a user interface 1412 is optional, and may be omitted in some examples, such as a base station.

The processor 1404 is responsible for managing the bus 1402 and general processing, including the execution of software stored on the computer-readable medium 1406. The software, when executed by the processor 1404, causes the processing system 1414 to perform the various functions described below for any particular apparatus. The computer-readable medium 1406 and the memory 1405 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1406. The computer-readable medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1406 may reside in the processing system 1414, external to the processing system 1414, or distributed across multiple entities including the processing system 1414. The computer-readable medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions, including, for example, cell synchronization and timing advance management in a communication network configured for L1-L2 centric mobility. For example, the circuitry may be configured to implement one or more of the functions described herein, for example, in relation to FIG. 15.

In some aspects of the disclosure, the processor 1404 may include communication and processing circuitry 1440 configured for various functions, including for example communicating with a network core (e.g., a 5G core network), base stations, cells, TRPs, DUs, scheduled entities (e.g., UE), or any other entity, such as, for example, local infrastructure or an entity communicating with the network entity 1400 via the Internet, such as a network provider. In some examples, the communication and processing circuitry 1440 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1440 may include one or more transmit/receive chains. In addition, the communication and processing circuitry 1440 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1440 may further be configured to execute communication and processing software 1450 stored on the computer-readable medium 1406 to implement one or more functions described herein.

In some implementations where the communication involves receiving information, the communication and processing circuitry 1440 may obtain information from a component of the network entity 1400 (e.g., from the transceiver 1410 that receives the information via radio frequency signaling or some other type of signaling suitable for the applicable communication medium), process (e.g., decode) the information, and output the processed information. For example, the communication and processing circuitry 1440 may output the information to another component of the processor 1404, to the memory 1405, or to the bus interface 1408. In some examples, the communication and processing circuitry 1440 may receive one or more of signals, messages, other information, or any combination thereof. In some examples, the communication and processing circuitry 1440 may receive information via one or more channels. In some examples, the communication and processing circuitry 1440 may include functionality for a means for receiving. In some examples, the communication and processing circuitry 1440 may include functionality for a means for processing, including a means for demodulating, a means for decoding, etc.

In some implementations where the communication involves sending (e.g., transmitting) information, the communication and processing circuitry 1440 may obtain information (e.g., from another component of the processor 1404, the memory 1405, or the bus interface 1408), process (e.g., modulate, encode, etc.) the information, and output the processed information. For example, the communication and processing circuitry 1440 may output the information to the transceiver 1410 (e.g., that transmits the information via radio frequency signaling or some other type of signaling suitable for the applicable communication medium). In some examples, the communication and processing circuitry 1440 may send one or more of signals, messages, other information, or any combination thereof. In some examples, the communication and processing circuitry 1440 may send information via one or more channels. In some examples, the communication and processing circuitry 1440 may include functionality for a means for sending (e.g., a means for transmitting). In some examples, the communication and processing circuitry 1440 may include functionality for a means for generating, including a means for modulating, a means for encoding, etc.

In some aspects of the disclosure, the processor 1404 may include L1-L2 mobility circuitry 1442 configured for various functions used for L1-L2 mobility operations. In one example, the L1-L2 mobility circuitry 1442 can be configured to select beam, cells, and/or TRPs for beam-based mobility using L1-L2 centric signaling. In one example, the L1-L2 mobility circuitry 1442 can be used to configure and maintain cells for supporting fast L1-L2 mobility. In one example, the L1-L2 mobility circuitry 1442 can be used to perform mobility-related operations, for example, switching or handover between beams, cells, base stations, or TRPs using L1-L2 centric signaling. The L1-L2 mobility circuitry 1442 may further be configured to execute L1-L2 mobility software 1452 stored on the computer-readable medium 1406 to implement one or more functions described herein.

In some aspects of the disclosure, the processor 1404 may include TAG management circuitry 1444 configured for various functions, for example, configuring and maintaining one or more TAGs to facilitate L1-L2 centric mobility operations. In one aspect, the TAG management circuitry 1444 can be used to update and maintain the timing advance of a plurality of cells per TAG. For example, the scheduling entity can store TAG information 1420 of a plurality of cells in the memory 1405. In one example, the scheduling entity can transmit timing advance (TA) updates of the cells in an RRC message, DCI, and/or MAC-CE. In one aspect, the scheduling entity can use the communication and processing circuitry 1440 to transmit the TA update via the transceiver 1410 and antenna array 1411. The TAG management circuitry 1444 can be used to manage and update the TAGs, for example, adding a cell to and/or removing a cell from a TAG as described above in relation to FIG. 8. The TAG management circuitry 1444 may further be configured to execute TAG management software 1454 stored on the computer-readable medium 1406 to implement one or more functions described herein.

Figure 15:
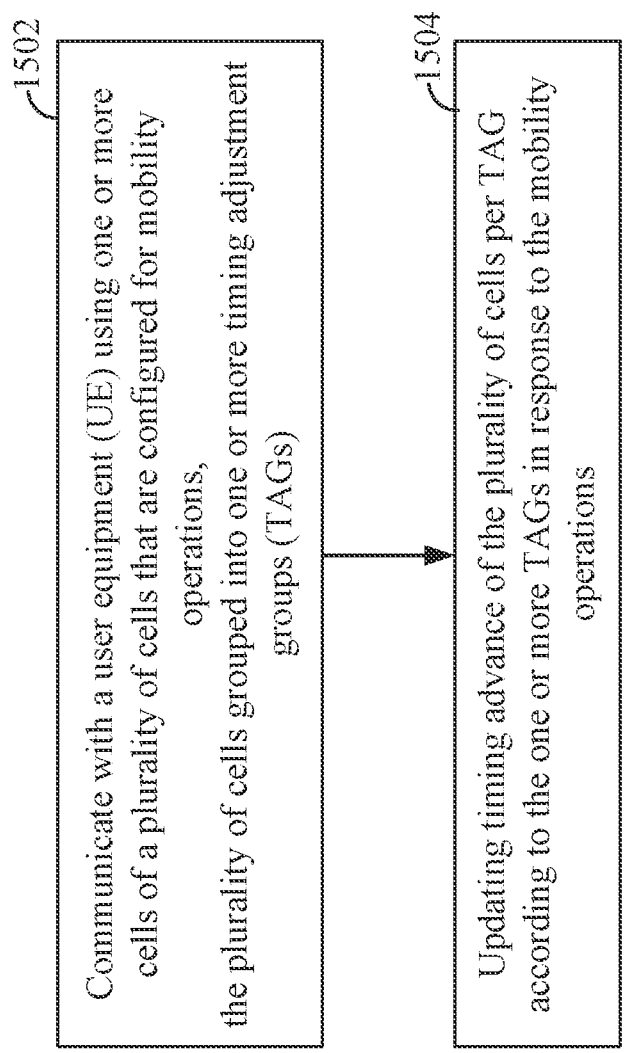
FIG. 15 is a flow chart illustrating an exemplary process for cell timing management in a wireless network configured for L1-L2 centric mobility according to some aspects.

FIG. 15 is a flow chart illustrating an exemplary process 1500 for cell timing management in a wireless network configured for L1-L2 inter-cell mobility according to some aspects. As described below, some or all illustrated features may be omitted in a particular implementation within the scope of the present disclosure, and some illustrated features may not be required for the implementation of all examples. In some examples, the process 1500 may be carried out by the network entity 1400 illustrated in FIG. 14. In some examples, the process 1500 may be carried out by any suitable apparatus or means for carrying out the functions or algorithm described below.

At block 1502, a base station can communicate with a UE using one or more cells of a plurality of cells that are configured for mobility operations, for example, using L1-L2 centric signaling. The plurality of cells can be grouped into one or more timing adjustment groups (TAGs) that are configured to use L1-L2 centric signaling for mobility operations, for example, switching between PCells and/or SCells. In one example, the plurality of cells may be the set of cells 806 of FIG. 8. The base station can maintain the TAG information 1420 of the cells in the memory 1405. In one aspect, the base station can use the communication and processing circuitry 1440 and the transceiver 1410 to communicate with the UE using one or more of the plurality of cells. In one aspect, the base station can use the L1-L2 mobility circuitry 1442 to perform mobility-related operations, for example, switching or handover between beams, cells, base stations, or TRPs using L1-L2 centric signaling.

In some aspects, a UE can be configured to use the same or similar TA for cells in the same TAG. In one example, the TAGs can include a first TAG and a second TAG that is different from the first TAG in terms of configured TA values of the respective cells included in the first TAG and the second TAG. Each of the plurality of cells can be assigned to a corresponding TAG based on at least one of frequency band, repeater usage, cell location, or UE location.

At block 1504, the base station can update the timing advance of the plurality of cells per TAG according to the one or more TAGs in response to the mobility operations. For example, the base station can send a timing advance update for a group of cells associated with the same TAG. Cells in the same TAG can use the same uplink TA value. In one aspect, the base station can use the TAG management circuitry 1444 to update the TA of the plurality of cells. In one example, the base station can transmit TA update of the cells in an RRC message, DCI, and/or MAC-CE. In one aspect, the base station can use the communication and processing circuitry 1440 to transmit the TA update via the transceiver 1410 and antenna array 1411. The base station can also use the TAG management circuitry to manage and update the TAGs, for example, adding cells to and/or removing cells from the TAGs as described above in relation to FIG. 8.

In one aspect, the base station can activate a first cell of the plurality of cells and transmit the TA value assigned to a TAG including the first cell using L1-L2 centric signaling. In one aspect, the TA value of the first cell is the same as a TA value of at least one activated cell when the first cell and the at least one activated cell are included in the same TAG. In one aspect, the base station can transmit a PDCCH order to initiate a RACH procedure between the UE and the first cell such that the UE can obtain the TA value of the first cell. In one aspect, the base station can activate a first cell of the plurality of cells using L1-L2 centric signaling; and update a designation of a TAG including the first cell based on whether the first cell is a PCell or an SCell. In one aspect, the base station can transmit a TAG update to update the association between the plurality of cells and one or more TAGs. The base station can transmit the TAG update to the UE using L1-L2 centric signaling.

In one configuration, the network entity 1400 includes means for cell synchronization and timing management in a wireless network configured for L1-L2 centric mobility. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1, 2, 4-6, 8 and/or 9, and utilizing, for example, the processes and/or algorithms described herein in relation to FIGS. 8-13.

Figure 16:
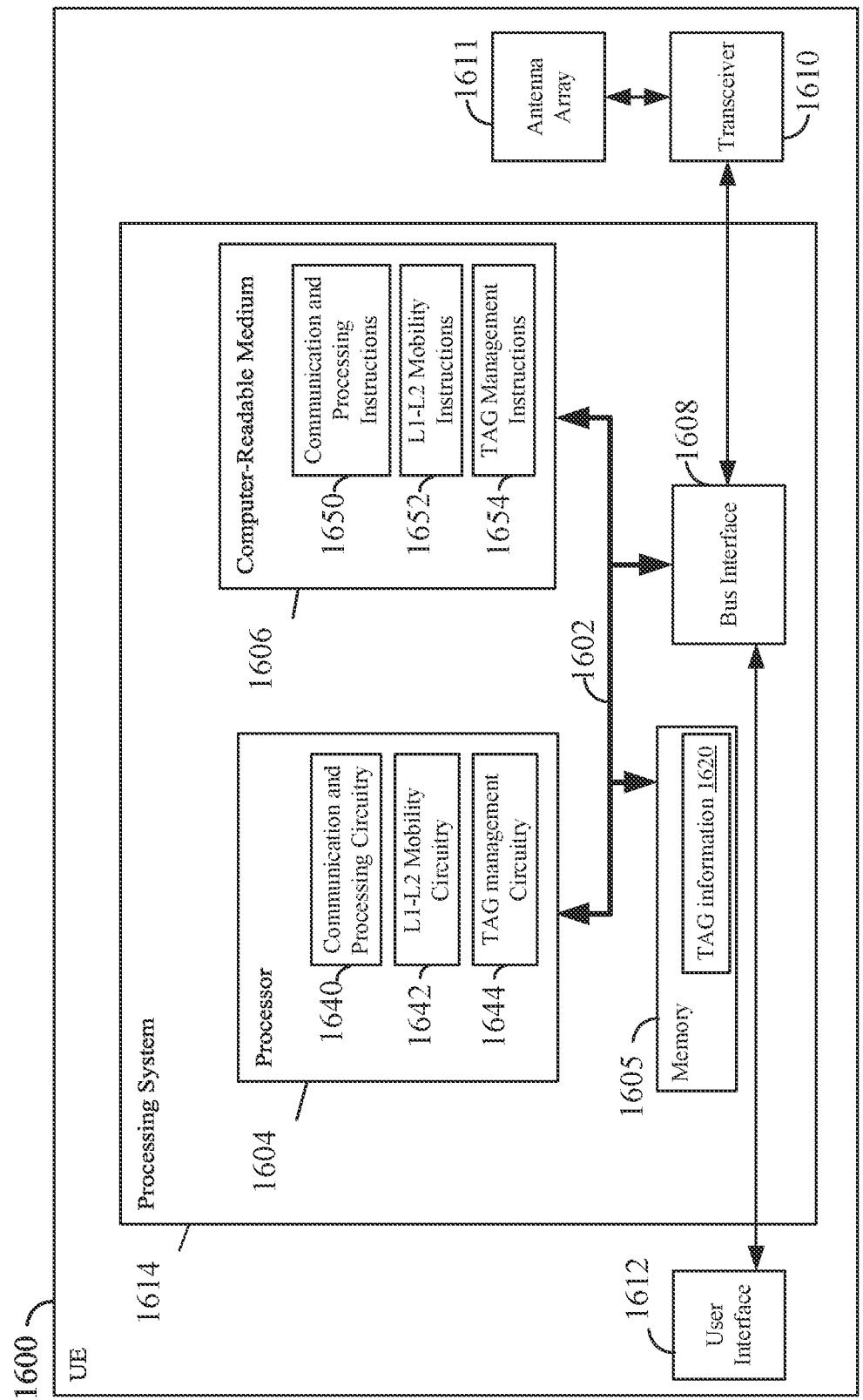
FIG. 16 is a block diagram conceptually illustrating an example of a hardware implementation for a user equipment according to some aspects.

FIG. 16 is a diagram illustrating an example of a hardware implementation for an exemplary UE 1600 employing a processing system 1614. In accordance with various aspects of the disclosure, an element, or any portion of an element, or any combination of elements may be implemented with a processing system 1614 that includes one or more processors 1604. For example, the UE 1600 may be a user equipment (UE) as illustrated in any one or more of FIGS. 1, 2, 5, 6, 8, and/or 9.

The processing system 1614 may be substantially the same as the processing system 1414 illustrated in FIG. 14, including a bus interface 1608, a bus 1602, memory 1605, a processor 1604, and a computer-readable medium 1606. Furthermore, the UE 1600 may include a user interface 1612 and a transceiver 1610 substantially similar to those described above in FIG. 14. That is, the processor 1604, as utilized in a UE 1600, may be used to implement any one or more of the processes described below and illustrated in FIG. 17.

In some aspects of the disclosure, the processor 1604 may include circuitry configured for various functions, including, for example, cell synchronization and timing advance management in a communication network configured for L1-L2 centric mobility. For example, the circuitry may be configured to implement one or more of the functions described herein, for example, in relation to FIG. 17.

In some aspects of the disclosure, the processor 1604 may include communication and processing circuitry 1640 configured for various functions, including for example, communicating with base stations, cells, TRPs, DUs, or any other entity. In some examples, the communication and processing circuitry 1640 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1640 may include one or more transmit/receive chains. In addition, the communication and processing circuitry 1640 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1640 may further be configured to execute communication and processing software 1650 stored on the computer-readable medium 1606 to implement one or more functions described herein.

In some implementations where the communication involves receiving information, the communication and processing circuitry 1640 may obtain information from a component of the UE 1600 (e.g., from the transceiver 1610 that receives the information via radio frequency signaling or some other type of signaling suitable for the applicable communication medium), process (e.g., decode) the information, and output the processed information. For example, the communication and processing circuitry 1640 may output the information to another component of the processor 1604, to the memory 1605, or to the bus interface 1608. In some examples, the communication and processing circuitry 1640 may receive one or more of signals, messages, other information, or any combination thereof. In some examples, the communication and processing circuitry 1640 may receive information via one or more channels. In some examples, the communication and processing circuitry 1640 may include functionality for a means for receiving. In some examples, the communication and processing circuitry 1640 may include functionality for a means for processing, including a means for demodulating, a means for decoding, etc.

In some implementations where the communication involves sending (e.g., transmitting) information, the communication and processing circuitry 1640 may obtain information (e.g., from another component of the processor 1604, the memory 1605, or the bus interface 1608), process (e.g., modulate, encode, etc.) the information, and output the processed information. For example, the communication and processing circuitry 1640 may output the information to the transceiver 1610 (e.g., that transmits the information via radio frequency signaling or some other type of signaling suitable for the applicable communication medium). In some examples, the communication and processing circuitry 1640 may send one or more of signals, messages, other information, or any combination thereof. In some examples, the communication and processing circuitry 1640 may send information via one or more channels. In some examples, the communication and processing circuitry 1640 may include functionality for a means for sending (e.g., a means for transmitting). In some examples, the communication and processing circuitry 1640 may include functionality for a means for generating, including a means for modulating, a means for encoding, etc.

In some aspects of the disclosure, the processor 1604 may include L1-L2 mobility circuitry 1642 configured for various functions used for L1-L2 centric mobility operations. In one example, the L1-L2 mobility circuitry 1642 can be configured to select beam, cells, base stations, and/or TRPs for beam-based mobility using L1-L2 centric signaling. In one example, the L1-L2 mobility circuitry 1642 can be used to configure and maintain cells for fast L1-L2 mobility. In one example, the L1-L2 mobility circuitry 1642 can be used to perform mobility-related operations, for example, switching or handover between beams, cells, base stations, or TRPs using L1-L2 centric signaling. The L1-L2 mobility circuitry 1642 may further be configured to execute L1-L2 mobility software 1652 stored on the computer-readable medium 1606 to implement one or more functions described herein.

In some aspects of the disclosure, the processor 1604 may include TAG management circuitry 1644 configured for various functions, for example, configuring and maintaining one or more TAGs to facilitate L1-L2 centric mobility operations. In one aspect, the TAG management circuitry 1644 can be used to update the timing advance of the plurality of cells per TAG. For example, the UE can store TAG information 1620 in the memory 1605. In one example, the UE can receive timing advance (TA) updates of the cells in an RRC message, DCI, and/or MAC CE. In one aspect, the UE can use the communication and processing circuitry 1640 to receive the TA update via the transceiver 1610 and antenna array 1611. The TAG management circuitry 1644 can be used to manage and update the TAGs, for example, adding cells to and/or removing cells from the TAGs as described above in relation to FIG. 8. The TAG management circuitry 1644 may further be configured to execute TAG management software 1654 stored on the computer-readable medium 1606 to implement one or more functions described herein.

Figure 17:
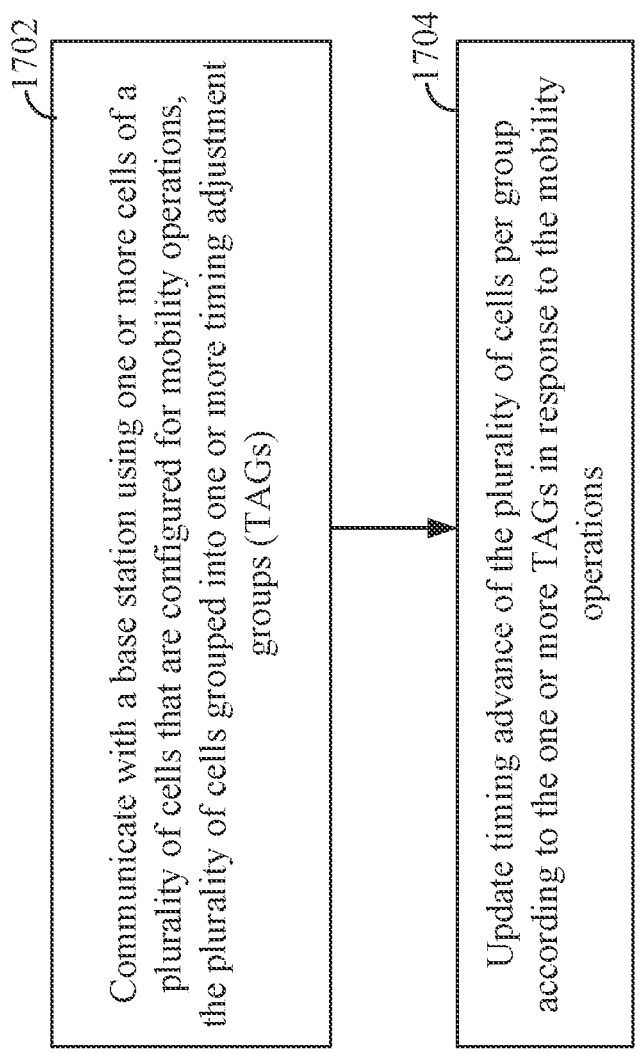
FIG. 17 is a flow chart illustrating an exemplary process for cell timing management in a wireless network configured for L1-L2 centric mobility according to some aspects.

FIG. 17 is a flow chart illustrating an exemplary process 1700 for cell synchronization and timing management in a wireless network configured for L1-L2 mobility according to some aspects. As described below, some or all illustrated features may be omitted in a particular implementation within the scope of the present disclosure, and some illustrated features may not be required for the implementation of all examples. In some examples, the process 1700 may be carried out by the UE 1600 illustrated in FIG. 16. In some examples, the process 1700 may be carried out by any suitable apparatus or means for carrying out the functions or algorithm described below.

At block 1702, a UE can communicate with a base station using one or more cells of a plurality of cells that are configured for mobility operations, for example, using L1-L2 centric signaling. The plurality of cells can be grouped into one or more TAGs that are configured to use L1-L2 centric signaling for mobility operations. In one aspect, the UE can keep the TAG information 1620 in the memory 1605. In one example, the plurality of cells may be the set of cells 806 of FIG. 8. In one aspect, the UE can use the communication and processing circuitry 1640 and the transceiver 1610 to communicate with the base station using one or more of the plurality of cells. In one aspect, the UE can use the L1-L2 mobility circuitry 1642 to perform mobility-related operations, for example, switching or handover between beams, cells, base stations, or TRPs using L1-L2 centric signaling.

In one aspect, a set of cells associated with the same TAG can use the same TA. In one example, the TAGs can include a first TAG and a second TAG that is different from the first TAG in terms of configured TA values of the respective cells included in the first TAG and the second TAG. Each of the plurality of cells can be assigned to a corresponding TAG, based on at least one of frequency band, repeater usage, cell location, or UE location.

At block 1704, the UE can update the TA of the plurality of cells per TAG according to the one or more TAGs in response to the mobility operations. For example, the UE can receive a TA update for a group of cells associated with the same TAG. Cells in the same TAG can use the same uplink TA value. In one aspect, the UE can use the TAG management circuitry 1644 to update the timing advance of the plurality of cells. In one example, the UE can receive TA update of the cells in an RRC message, DCI, and/or MAC CE. In one aspect, the UE can use the communication and processing circuitry 1640 to receive the TA update via the transceiver 1610 and antenna array 1611. The UE can also use the TAG management circuitry 1644 to manage and update the TAGs, for example, adding cells to and/or removing cells from the TAGs as described above in relation to FIG. 8.

In one aspect, the UE can activate a first cell and receive the TA value assigned to a TAG including the first cell using L1-L2 centric signaling. In one aspect, the TA value of the first cell can be the same as a TA value of at least one activated cell when the first cell and the at least one activated cell are included in the same TAG. In one aspect, the UE can receive a PDCCH order that initiates a RACH procedure between the UE and the first cell such that the UE can obtain the TA value of the first cell. In one aspect, the UE can receive a TAG update to update the association between the plurality of cells and one or more TAGs. The UE can receive the TAG update using L1-L2 centric signaling.

In one configuration, the UE 1600 includes means for cell synchronization and timing management in a wireless network configured for L1-L2 centric inter-cell mobility. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4-6, 8 and/or 9, and utilizing, for example, the processes and/or algorithms described herein in relation to FIGS. 8-13.

In one configuration, the UE 1600 includes means for cell timing management in a wireless network configured for L1-L2 centric inter-cell mobility. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1, 2, 4-6, 8 and/or 9, and utilizing, for example, the processes and/or algorithms described herein in relation to FIGS. 8-13.

In a first aspect, a user equipment (UE) for wireless communication, comprises: a transceiver; a memory; and a processor coupled to the transceiver and the memory. The processor and the memory are configured to: communicate with a network entity using one or more cells of a plurality of cells that are configured for mobility operations, the plurality of cells grouped into one or more timing adjustment groups (TAGs); and update timing advance of the plurality of cells per group according to the one or more TAGs in response to the mobility operations.

In a second aspect, alone or in combination with the first aspect, wherein a set of cells of the plurality of cells in a same timing adjustment group (TAG) of the one or more TAGs are configured to use a same timing advance (TA) value.

In a third aspect, alone or in combination with the first aspect, wherein the one or more TAGs comprise a first TAG and a second TAG that is different from the first TAG in terms of configured timing advance (TA) values of the respective cells included in the first TAG and the second TAG.

In a fourth aspect, alone or in combination with any of the first to third aspects, wherein each of the plurality of cells is assigned to a corresponding TAG of the one or more TAGs, based on at least one of frequency band, repeater usage, cell location, or UE location.

In a fifth aspect, alone or in combination with any of the first to third aspects, wherein, the one or more TAGs comprise a first TAG and a second TAG, the processor and the memory are further configured to: perform a first random access channel procedure with a primary serving cell (PCell) to obtain initial uplink (UL) timing for a first set of cells included in the first TAG that comprises the PCell; and perform a second random access channel procedure with a secondary serving cell (SCell) to obtain initial UL timing for a second set of cells included in the second TAG that comprises exclusively one or more SCells.

In a sixth aspect, alone or in combination with any of the first to third aspects, wherein the processor and the memory are further configured to: receive, from the network entity using L1-L2 centric signaling, a command to activate a first cell of the plurality of cells; and determine a timing advance (TA) value of the first cell based on whether the first cell is assigned to a timing adjustment group (TAG) including at least one activated second cell among the plurality of cells.

In a seventh aspect, alone or in combination with the sixth aspect, wherein the processor and the memory are further configured to: set the TA value of the first cell the same as a TA value of the at least one activated second cell in response to the first cell and the at least one activated second cell being included in the same TAG.

In an eighth aspect, alone or in combination with the sixth aspect, wherein the command comprises a TA value of the first cell in response to the first cell being associated with a TAG including no activated cell.

In a ninth aspect, alone or in combination with the sixth aspect, wherein the processor and the memory are further configured to: receive a physical downlink control channel (PDCCH) order to initiate a random access channel procedure with the first cell to obtain the TA value.

In a tenth aspect, alone or in combination with any of the first to third aspects, wherein the processor and the memory are further configured to: activate a first cell of the plurality of cells using L1-L2 centric signaling; and update a designation of a TAG including the first cell based on whether the first cell is a primary serving cell (PCell) or a secondary serving cell (SCell).

In an eleventh aspect, alone or in combination with any of the first to third aspects, wherein the processor and the memory are further configured to: receive, from the network entity using L1-L2 centric signaling, a TAG update that updates the association between the plurality of cells and the one or more TAGs.

In a twelfth aspect, a method of wireless communication at a user equipment (UE), comprises: communicating with a network entity using one or more cells of a plurality of cells that are configured for mobility operations, the plurality of cells grouped into one or more timing adjustment groups (TAGs); and updating timing advance of the plurality of cells per group according to the one or more TAGs in response to the mobility operations.

In a thirteenth aspect, alone or in combination with the twelfth aspect, wherein a set of cells of the plurality of cells in a same timing adjustment group (TAG) of the one or more TAGs are configured to use a same timing advance (TA) value.

In a fourteenth aspect, alone or in combination with the twelfth aspect, wherein the one or more TAGs comprise a first TAG and a second TAG that is different from the first TAG in terms of configured timing advance (TA) values of the respective cells included in the first TAG and the second TAG.

In a fifteenth aspect, alone or in combination with any of the twelfth to fourteenth aspects, wherein each of the plurality of cells is assigned to a corresponding TAG of the one or more TAGs, based on at least one of frequency band, repeater usage, cell location, or UE location.

In a sixteenth aspect, alone or in combination with any of the twelfth to fourteenth aspects, wherein, the one or more TAGs comprise a first TAG and a second TAG, the method further comprising: performing a first random access channel procedure with a primary serving cell (PCell) to obtain initial uplink (UL) timing for a first set of cells included in the first TAG that comprises the PCell; and performing a second random access channel procedure with a secondary serving cell (SCell) to obtain initial UL timing for a second set of cells included in the second TAG that comprises exclusively one or more SCells.

In a seventeenth aspect, alone or in combination with any of the twelfth to fourteenth aspects, the method further comprises: receiving, from the network entity using L1-L2 centric signaling, a command to activate a first cell of the plurality of cells; and determining a timing advance (TA) value of the first cell based on whether the first cell is assigned to a timing adjustment group (TAG) including at least one activated second cell among the plurality of cells.

In an eighteenth aspect, alone or in combination with the seventeenth aspect, the method further comprises: setting the TA value of the first cell the same as a TA value of the at least one activated second cell in response to the first cell and the at least one activated second cell being included in the same TAG.

In a nineteenth aspect, alone or in combination with the seventeenth aspect, wherein the command comprises a TA value of the first cell in response to the first cell being associated with a TAG including no activated cell.

In a twentieth aspect, alone or in combination with the seventeenth aspect, the method further comprises: receiving a physical downlink control channel (PDCCH) order to initiate a random access channel procedure with the first cell to obtain the TA value.

In a twenty-first aspect, alone or in combination with any of the twelfth to fourteenth aspects, the method further comprises: activating a first cell of the plurality of cells using L1-L2 centric signaling; and updating a designation of a TAG including the first cell based on whether the first cell is a primary serving cell (PCell) or a secondary serving cell (SCell).

In a twenty-second aspect, alone or in combination with any of the twelfth to fourteenth aspects, the method further comprises: receiving, from the network entity using L1-L2 centric signaling, a TAG update that updates the association between the plurality of cells and the one or more TAGs.

In a twenty-third aspect, a network entity for wireless communication, comprises: a transceiver; a memory; and a processor coupled to the transceiver and the memory. The processor and the memory are configured to: communicate with a user equipment (UE) using one or more cells of a plurality of cells that are configured for mobility operations, the plurality of cells grouped into one or more timing adjustment groups (TAGs); and update timing advance of the plurality of cells per group according to the one or more TAGs in response to the mobility operations.

In a twenty-fourth aspect, alone or in combination with the twenty-third aspect, wherein a set of cells of the plurality of cells in a same timing adjustment group (TAG) of the one or more TAGs are configured to use a same timing advance (TA) value.

In a twenty-fifth aspect, alone or in combination with the twenty-third aspect, wherein the one or more TAGs comprise a first TAG and a second TAG that is different from the first TAG in terms of configured timing advance (TA) values of the respective cells included in the first TAG and the second TAG.

In a twenty-sixth aspect, alone or in combination with any of the twenty-third to twenty-fifth aspects, wherein each of the plurality of cells is assigned to a corresponding TAG of the one or more TAGs, based on at least one of frequency band, repeater usage, cell location, or UE location.

In a twenty-seventh aspect, alone or in combination with any of the twenty-third to twenty-fifth aspects, wherein the one or more TAGs comprise a first TAG and a second TAG, further comprising: performing a first random access channel procedure with a primary serving cell (PCell) to obtain initial uplink (UL) timing for a first set of cells included in the first TAG that comprises the PCell; and performing a second random access channel procedure with a secondary serving cell (SCell) to obtain initial UL timing for a second set of cells included in the second TAG that comprises exclusively one or more SCells.

In a twenty-eighth aspect, alone or in combination with any of the twenty-third to twenty-fifth aspects, wherein the processor and the memory are further configured to: activate a first cell of the plurality of cells; and transmit, to the UE using L1-L2 centric signaling, a timing advance (TA) value assigned to a TAG including the first cell.

In a twenty-ninth aspect, alone or in combination with the twenty-eighth aspect, wherein the TA value of the first cell is the same as a TA value of at least one activated cell in response to the first cell and the at least one activated cell being included in the same TAG.

In a thirtieth aspect, alone or in combination with the twenty-eighth aspect, wherein the processor and the memory are further configured to: transmit, to the UE, a physical downlink control channel (PDCCH) order to initiate a random access channel procedure with the first cell to obtain the TA value.

In a thirty-first aspect, alone or in combination with any of the twenty-third to twenty-fifth aspects, wherein the processor and the memory are further configured to: activate a first cell of the plurality of cells using L1-L2 centric signaling; and update a designation of a TAG including the first cell based on whether the first cell is a primary serving cell (PCell) or a secondary serving cell (SCell).

In a thirty-second aspect, alone or in combination with any of the twenty-third to twenty-fifth aspects, wherein the processor and the memory are further configured to: transmit, to the UE using L1-L2 centric signaling, a TAG update that updates the association between the plurality of cells and the one or more TAGs.

In a thirty-third aspect, a method of wireless communication at a network entity, comprises: communicating with a user equipment (UE) using one or more cells of a plurality of cells that are configured for mobility operations, the plurality of cells grouped into one or more timing adjustment groups (TAGs); and updating timing advance of the plurality of cells per group according to the one or more TAGs in response to the mobility operations.

In a thirty-fourth aspect, alone or in combination with the thirty-third aspect, wherein a set of cells of the plurality of cells in a same timing adjustment group (TAG) of the one or more TAGs are configured to use a same timing advance (TA) value.

In a thirty-fifth aspect, alone or in combination with the thirty-third aspect, wherein the one or more TAGs comprise a first TAG and a second TAG that is different from the first TAG in terms of configured timing advance (TA) values of the respective cells included in the first TAG and the second TAG.

In a thirty-sixth aspect, alone or in combination with any of the thirty-third to thirty-fifth aspects, wherein each of the plurality of cells is assigned to a corresponding TAG of the one or more TAGs, based on at least one of frequency band, repeater usage, cell location, or UE location.

In a thirty-seventh aspect, alone or in combination with any of the thirty-third to thirty-fifth aspects, wherein the one or more TAGs comprises a first TAG and a second TAG, further comprising: performing a first random access channel procedure with a primary serving cell (PCell) to obtain initial uplink (UL) timing for a first set of cells included in the first TAG that comprises the PCell; and performing a second random access channel procedure with a secondary serving cell (SCell) to obtain initial UL timing for a second set of cells included in the second TAG that comprises exclusively one or more SCells.

In a thirty-eighth aspect, alone or in combination with any of the thirty-third to thirty-fifth aspects, the method further comprises: activating a first cell of the plurality of cells; and transmitting, to the UE using L1-L2 centric signaling, a timing advance (TA) value assigned to a TAG including the first cell.

In a thirty-ninth aspect, alone or in combination with the thirty-eighth aspect, wherein the TA value of the first cell is the same as a TA value of at least one activated cell in response to the first cell and the at least one activated cell being included in the same TAG.

In a fortieth aspect, alone or in combination with the thirty-eighth aspect, the method further comprises: transmitting, to the UE, a physical downlink control channel (PDCCH) order to initiate a RACH procedure with the first cell to obtain the TA value.

In a forty-first aspect, alone or in combination with any of the thirty-third to thirty-fifth aspects, the method further comprises: activating a first cell of the plurality of cells using L1-L2 centric signaling; and updating a designation of a TAG including the first cell based on whether the first cell is a primary serving cell (PCell) or a secondary serving cell (SCell).

In a forty-second aspect, alone or in combination with any of the thirty-third to thirty-fifth aspects, the method further comprises: transmitting, to the UE using L1-L2 centric signaling, a TAG update that updates the association between the plurality of cells and the one or more TAGs.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A user equipment (UE) for wireless communication, comprising:
   one or more memories; and
   one or more processors coupled to the one or more memories, the one or more processors being configured to:

communicate with a network entity using one or more cells of a plurality of cells that are configured for mobility operations, the plurality of cells grouped into one or more timing adjustment groups (TAGs);

update timing advance of the plurality of cells per group according to the one or more TAGs in response to the mobility operations;

activate, using L1-L2 signaling, a first cell of the plurality of cells; and update, using L1-L2 signaling, a designation of a timing adjustment group (TAG) of the one or more TAGS, the TAG including the first cell based on whether the first cell is a primary serving cell (PCell) or a secondary serving cell (SCell).

2. The UE of claim 1, wherein a set of cells of the plurality of cells in a same TAG of the one or more TAGS are configured to use a same timing advance (TA) value.

3. The UE of claim 1, wherein the one or more TAGs comprise a first TAG and a second TAG that is different from the first TAG in terms of configured timing advance (TA) values of the respective cells included in the first TAG and the second TAG.

4. The UE of claim 1, wherein each of the plurality of cells is assigned to a corresponding TAG of the one or more TAGS, based on at least one of frequency band, repeater usage, cell location, or UE location.

5. The UE of claim 1, wherein, the one or more TAGS comprise a first TAG and a second TAG, the one or more processors are further configured to:

perform a first random access channel procedure with the PCell to obtain initial uplink (UL) timing for a first set of cells included in the first TAG that comprises the PCell; and perform a second random access channel procedure with the SCell to obtain initial UL timing for a second set of cells included in the second TAG that comprises exclusively one or more SCells.

6. The UE of claim 1, wherein the one or more processors are further configured to:

receive, from the network entity using L1-L2 centric signaling, a command to activate a first cell of the plurality of cells; and determine a timing advance (TA) value of the first cell based on whether the first cell is assigned to a timing adjustment group (TAG) including at least one activated second cell among the plurality of cells.

7. The UE of claim 6, wherein the one or more processors are further configured to:

set the TA value of the first cell the same as a TA value of the at least one activated second cell in response to the first cell and the at least one activated second cell being included in the same TAG.

8. The UE of claim 6, wherein the command comprises a TA value of the first cell in response to the first cell being associated with a TAG including no activated cell.

9. The UE of claim 6, wherein the one or more processors are further configured to:

receive a physical downlink control channel (PDCCH) order to initiate a random access channel procedure with the first cell to obtain the TA value.

10. The UE of claim 1, wherein the one or more processors are further configured to:

receive, from the network entity using L1-L2 centric signaling, a TAG update that updates the association between the plurality of cells and the one or more TAGS.

11. A method of wireless communication at a user equipment (UE), comprising:

communicating with a network entity using one or more cells of a plurality of cells that are configured for mobility operations, the plurality of cells grouped into one or more timing adjustment groups (TAGs);

updating timing advance of the plurality of cells per group according to the one or more TAGs in response to the mobility operations;

activating, using L1-L2 signaling, a first cell of the plurality of cells; and updating, using L1-L2 signaling, a designation of a TAG including the first cell based on whether the first cell is a primary serving cell (PCell) or a secondary serving cell (SCell).

12. The method of claim 11, wherein a set of cells of the plurality of cells in a same TAG of the one or more TAGS are configured to use a same timing advance (TA) value.

13. The method of claim 11, wherein the one or more TAGs comprise a first TAG and a second TAG that is different from the first TAG in terms of configured timing advance (TA) values of the respective cells included in the first TAG and the second TAG.

14. The method of claim 11, wherein each of the plurality of cells is assigned to a corresponding TAG of the one or more TAGS, based on at least one of frequency band, repeater usage, cell location, or UE location.

15. The method of claim 11, wherein, the one or more TAGs comprise a first TAG and a second TAG, the method further comprising:

performing a first random access channel procedure with the PCell to obtain initial uplink (UL) timing for a first set of cells included in the first TAG that comprises the PCell; and performing a second random access channel procedure with the SCell to obtain initial UL timing for a second set of cells included in the second TAG that comprises exclusively one or more SCells.

16. The method of claim 11, further comprising:

receiving, from the network entity using L1-L2 centric signaling, a command to activate a first cell of the plurality of cells; and determining a timing advance (TA) value of the first cell based on whether the first cell is assigned to a timing adjustment group (TAG) including at least one activated second cell among the plurality of cells.

17. The method of claim 16, further comprising:

setting the TA value of the first cell the same as a TA value of the at least one activated second cell in response to the first cell and the at least one activated second cell being included in the same TAG.

18. The method of claim 16, wherein the command comprises a TA value of the first cell in response to the first cell being associated with a TAG including no activated cell.

19. The method of claim 16, further comprising:

receiving a physical downlink control channel (PDCCH) order to initiate a random access channel procedure with the first cell to obtain the TA value.

20. The method of claim 11, further comprising:

receiving, from the network entity using L1-L2 centric signaling, a TAG update that updates the association between the plurality of cells and the one or more TAGS.

21. A network entity for wireless communication, comprising:

one or more memories; and one or more processors coupled to the one or more memories, the one or more processors being configured to:

communicate with a user equipment (UE) using one or more cells of a plurality of cells that are configured for mobility operations, the plurality of cells grouped into one or more timing adjustment groups (TAGs);

update timing advance of the plurality of cells per group according to the one or more TAGs in response to the mobility operations;

activate, using L1-L2 signaling, a first cell of the plurality of cells; and update, using L1-L2 signaling, a designation of a timing adjustment group (TAG) of the one or more TAGS, the TAG including the first cell based on whether the first cell is a primary serving cell (PCell) or a secondary serving cell (SCell).

22. The network entity of claim 21, wherein a set of cells of the plurality of cells in a same TAG of the one or more TAGs are configured to use a same timing advance (TA) value.

23. The network entity of claim 21, wherein the one or more TAGS comprise a first TAG and a second TAG that is different from the first TAG in terms of configured timing advance (TA) values of the respective cells included in the first TAG and the second TAG.

24. The network entity of claim 21, wherein each of the plurality of cells is assigned to a corresponding TAG of the one or more TAGS, based on at least one of frequency band, repeater usage, cell location, or UE location.

25. The network entity of claim 21, wherein, the one or more TAGs comprise a first TAG and a second TAG, the one or more processors are further configured to:

perform a first random access channel procedure with the PCell to obtain initial uplink (UL) timing for a first set of cells included in the first TAG that comprises the PCell; and perform a second random access channel procedure with the SCell to obtain initial UL timing for a second set of cells included in the second TAG that comprises exclusively one or more SCells.

26. The network entity of claim 21, wherein the one or more processors are further configured to:

transmit, to the UE using L1-L2 centric signaling, a timing advance (TA) value assigned to the TAG including the first cell.

27. The network entity of claim 26, wherein the TA value of the first cell is the same as a TA value of at least one activated cell in response to the first cell and the at least one activated cell being included in the same TAG.

28. The network entity of claim 26, wherein the one or more processors are further configured to:

transmit, to the UE, a physical downlink control channel (PDCCH) order to initiate a random access channel procedure with the first cell to obtain the TA value.

29. The network entity of claim 21, wherein the one or more processors are further configured to:

transmit, to the UE using L1-L2 centric signaling, a TAG update that updates the association between the plurality of cells and the one or more TAGS.

30. A method of wireless communication at a network entity, comprising:

communicating with a user equipment (UE) using one or more cells of a plurality of cells that are configured for mobility operations, the plurality of cells grouped into one or more timing adjustment groups (TAGs);

updating timing advance of the plurality of cells per group according to the one or more TAGs in response to the mobility operations;

activating, using L1-L2 signaling, a first cell of the plurality of cells; and updating, using L1-L2 signaling, a designation of a timing adjustment group (TAG) of the one or more TAGS, the TAG including the first cell based on whether the first cell is a primary serving cell (PCell) or a secondary serving cell (SCell).

31. The method of claim 30, wherein a set of cells of the plurality of cells in a same TAG of the one or more TAGS are configured to use a same timing advance (TA) value.

32. The method of claim 30, wherein the one or more TAGS comprise a first TAG and a second TAG that is different from the first TAG in terms of configured timing advance (TA) values of the respective cells included in the first TAG and the second TAG.

33. The method of claim 30, wherein each of the plurality of cells is assigned to a corresponding TAG of the one or more TAGS, based on at least one of frequency band, repeater usage, cell location, or UE location.

34. The method of claim 30, wherein the one or more TAGS comprise a first TAG and a second TAG, further comprising:

performing a first random access channel procedure with the PCell to obtain initial uplink (UL) timing for a first set of cells included in the first TAG that comprises the PCell; and performing a second random access channel procedure with the SCell to obtain initial UL timing for a second set of cells included in the second TAG that comprises exclusively one or more SCells.

35. The method of claim 30, further comprising:

transmitting, to the UE using L1-L2 centric signaling, a timing advance (TA) value assigned to the TAG including the first cell.

36. The method of claim 35, wherein the TA value of the first cell is the same as a TA value of at least one activated cell in response to the first cell and the at least one activated cell being included in the same TAG.

37. The method of claim 35, further comprising:

transmitting, to the UE, a physical downlink control channel (PDCCH) order to initiate a RACH procedure with the first cell to obtain the TA value.

38. The method of claim 30, further comprising:

transmitting, to the UE using L1-L2 centric signaling, a TAG update that updates the association between the plurality of cells and the one or more TAGS.

39. A user equipment (UE) for wireless communication, comprising:

means for communicating with a network entity using one or more cells of a plurality of cells that are configured for mobility operations, the plurality of cells grouped into one or more timing adjustment groups (TAGs);

means for updating timing advance of the plurality of cells per group according to the one or more TAGs in response to the mobility operations;

means for activate, using L1-L2 signaling, a first cell of the plurality of cells; and means for update, using L1-L2 signaling, a designation of a timing adjustment group (TAG) of the one or more TAGS, the TAG including the first cell based on whether the first cell is a primary serving cell (PCell) or a secondary serving cell (SCell).

40. A non-transitory computer-readable storage medium comprising code executable by an apparatus for wireless communication, the code causing the apparatus to:

communicate with a network entity using one or more cells of a plurality of cells that are configured for mobility operations, the plurality of cells grouped into one or more timing adjustment groups (TAGs);

update timing advance of the plurality of cells per group according to the one or more TAGs in response to the mobility operations;

activate, using L1-L2 centric signaling, a first cell of the plurality of cells; and update, using L1-L2 centric signaling, a designation of a timing adjustment group (TAG) of the one or more TAGS, the TAG including the first cell based on whether the first cell is a primary serving cell (PCell) or a secondary serving cell (SCell).

41. A network entity for wireless communication, comprising:

means for communicating with a user equipment (UE) using one or more cells of a plurality of cells that are configured for mobility operations, the plurality of cells grouped into one or more timing adjustment groups (TAGs);

means for updating timing advance of the plurality of cells per group according to the one or more TAGs in response to the mobility operations;

means for activate, using L1-L2 centric signaling, a first cell of the plurality of cells; and means for update, using L1-L2 centric signaling, a designation of a timing adjustment group (TAG) of the one or more TAGS, the TAG including the first cell based on whether the first cell is a primary serving cell (PCell) or a secondary serving cell (SCell).

42. A non-transitory computer-readable storage medium comprising code executable by an apparatus for wireless communication, the code causing the apparatus to:

communicate with a user equipment (UE) using one or more cells of a plurality of cells that are configured for mobility operations, the plurality of cells grouped into one or more timing adjustment groups (TAGs);

update timing advance of the plurality of cells per group according to the one or more TAGs in response to the mobility operations;

activate, using L1-L2 centric signaling, a first cell of the plurality of cells; and update, using L1-L2 centric signaling, a designation of a timing adjustment group (TAG) of the one or more TAGS, the TAG including the first cell based on whether the first cell is a primary serving cell (PCell) or a secondary serving cell (SCell).

* * * * *